Dec. 26, 1950 T. R. HARRISON ET AL 2,535,412
MEASURING AND CONTROL METHOD AND APPARATUS
Filed March 31, 1944 4 Sheets-Sheet 1

INVENTOR.
THOMAS R. HARRISON
LLOYD B. CHERRY
BY
ATTORNEY

Dec. 26, 1950  T. R. HARRISON ET AL  2,535,412
MEASURING AND CONTROL METHOD AND APPARATUS
Filed March 31, 1944  4 Sheets-Sheet 2

*INVENTOR.*
THOMAS R. HARRISON
LLOYD B. CHERRY
BY
*ATTORNEY.*

Dec. 26, 1950     T. R. HARRISON ET AL     2,535,412
MEASURING AND CONTROL METHOD AND APPARATUS

Filed March 31, 1944     4 Sheets-Sheet 3

INVENTOR.
THOMAS R. HARRISON
LLOYD B. CHERRY
BY
*C B Spangenberg*
ATTORNEY.

Dec. 26, 1950 — T. R. HARRISON ET AL — 2,535,412

MEASURING AND CONTROL METHOD AND APPARATUS

Filed March 31, 1944 — 4 Sheets-Sheet 4

*INVENTOR.*
THOMAS R. HARRISON
LLOYD B. CHERRY
BY
C. B. Spangenberg
ATTORNEY.

Patented Dec. 26, 1950

2,535,412

UNITED STATES PATENT OFFICE

2,535,412

MEASURING AND CONTROL METHOD AND APPARATUS

Thomas R. Harrison, Wyncote, and Lloyd B. Cherry, Philadelphia County, Pa., assignors, by mesne assignments, to Minneapolis-Honeywell Regulator Company, Minneapolis, Minn., a corporation of Delaware Application March 31, 1944, Serial No. 528,866

26 Claims. (Cl. 175—183)

The present invention relates to an improved method of and apparatus for detecting and measuring magnetic flux.

A general object of the invention is to provide an improved method of and apparatus for detecting and measuring the total number of lines of induction in a magnetic field which are cut by an exploring object subjected to said magnetic field.

It is also an object of the invention to provide an improved method of and apparatus of this character in which such detection and measurement are independent of the rate of travel of the coil through the magnetic field or conversely the rate of travel of the magnetic field past the coil.

Another object of the invention is to provide such an improved method and apparatus which provide an indication of the relative directions of movement of the magnetic field and the exploring object.

A specific object of the invention is to provide improvements in apparatus for indicating and/or recording the presence of magnetic flux in the vicinity of an exploring coil and also the relative directions of movement of the magnetic field and said exploring coil. A more specific object of the invention is to provide such improved apparatus in which control means are incorporated for actuating an audible or visual signal when the total number of lines of induction cut by the exploring coil exceeds a predetermined value.

It is a particular object of the invention to provide an improved indicating and/or recording apparatus for indicating and/or recording the total number of lines of induction in a magnetic field which are cut by an exploring object wherein the indicating and/or recording elements are positioned by power-set means including a rugged reversible electrical motor.

A further specific object of the invention is to provide such indicating and/or recording apparatus wherein suitable means are incorporated to return the indicating and/or recording elements to a predetermined central position and to there maintain the said elements as long as no lines of induction are cut by the exploring coil.

The provision of simple and easily adjusted means to eliminate errors due to parasitic and other extraneous effects; the provision of simple and efficient means to adjust the sensitivity of response of the apparatus to the cutting of lines of induction by the exploring coil; and the provision of equally simple and efficient means to vary the range of response of the apparatus to lines of induction cut by the exploring coil all constitute additional objects of the invention.

The present invention relies for its operation upon the discovery that the speed of rotation of a reversible electrical motor in both directions may be made to vary in a linear manner over a wide range with the magnitude of electromotive force obtained from an exploring object, such as a coil comprising a suitable number of turns, which is subjected to a magnetic field under observation. Such linearity of response is obtained over a range of approximately 1700 microvolts, motor rotation being initiated by a very small electromotive force of approximately 10 microvolts, by means of the present invention notwithstanding the fact that prior art motor drive systems capable of initiating motor operation on 10 microvolts produce maximum motor speed with an input electromotive force of 30 microvolts or less. This desirable operation is obtained by superimposing an opposing electromotive force on that derived from the exploring coil to suppress the influence of the latter in tending to increase the motor speed as the derived electromotive force increases in magnitude. In this manner the motor speed increasing energizing effect produced by the electromotive force derived from the exploring coil may be suppressed to such an extent that the motor does not reach full speed until the exploring coil electromotive force attains a value of approximately 1700 microvolts even though the motor would otherwise reach full speed when an electromotive force of 30 microvolts or less is impressed on the input circuit of the motor drive system. Such suppression is accomplished, moreover, while retaining the desirable characteristic of permitting initiation of motor rotation on very small electromotive forces of the order of 10 microvolts.

The present invention also relies for its operation upon the discovery that apparatus operative to measure the number of lines of induction cut by the exploring coil is obtained when the motor speed is a linear function of the electromotive force derived from the exploring coil. This phenomenon is described in detail hereinafter in connection with the description of the drawings, but may also be explained mathematically. For example, consider the electromotive force $$e = f(t) \qquad (1)$$

derived in an exploring coil where $e$ is the instantaneous potential at any time ($t$). Also $$e = k\frac{d\phi}{dt} \qquad (2)$$

where $$\frac{d\phi}{dt}$$

is the rate of change of flux with respect to time. Hence $$\frac{d\phi}{dt} = \frac{1}{k}f(t) \qquad (3)$$

and $$\phi = \frac{1}{k}\int_{t_0}^{t_1} f(t)\,dt \qquad (4)$$

where $\phi$ is the flux cut in the time $(t_1-t_0)$. Now also consider the relation $$s = Ke \quad (5)$$

where $s$ is the speed of travel of the exhibiting element or pointer power-set by the reversible motor, and accordingly, is a function of the motor speed. Since the distance (D) the exhibiting element travels is a function of the speed of travel and the time of travel, it is seen that $$D = \int_{t_0}^{t_1} s\, dt \quad (6)$$

represents the distance the exhibiting element travels in time $(t_1-t_0)$. Considering Equations 1, 5 and 6 it is seen that $$D = K \int_{t_0}^{t_1} f(t)\, dt \quad (7)$$

From a consideration of Equations 4 and 7 the relation $$\phi = \frac{1}{kK} D \quad (8)$$

is obtained which represents that the flux or number of lines of induction cut by the exploring coil is directly proportional to the deflection. Note also that the direction of motor travel is a function of the direction in which the flux is cut. Hence, over a complete cycle of movement of the exploring coil into the magnetic field and out again, the exhibiting element will be deflected in first one direction and then the other and then tend to be returned to its starting position. In addition, the peak deflection will indicate the maximum number of lines of induction cut in any one direction.

The various features of novelty which characterize our invention are pointed out with particularity in the claims annexed to and forming a part of this specification. For a better understanding of the invention, however, its advantages and specific objects obtained from its use, reference should be had to the accompanying drawings and descriptive matter in which we have illustrated and described preferred forms of the apparatus for use in the practice of the present invention.

Figure 1:
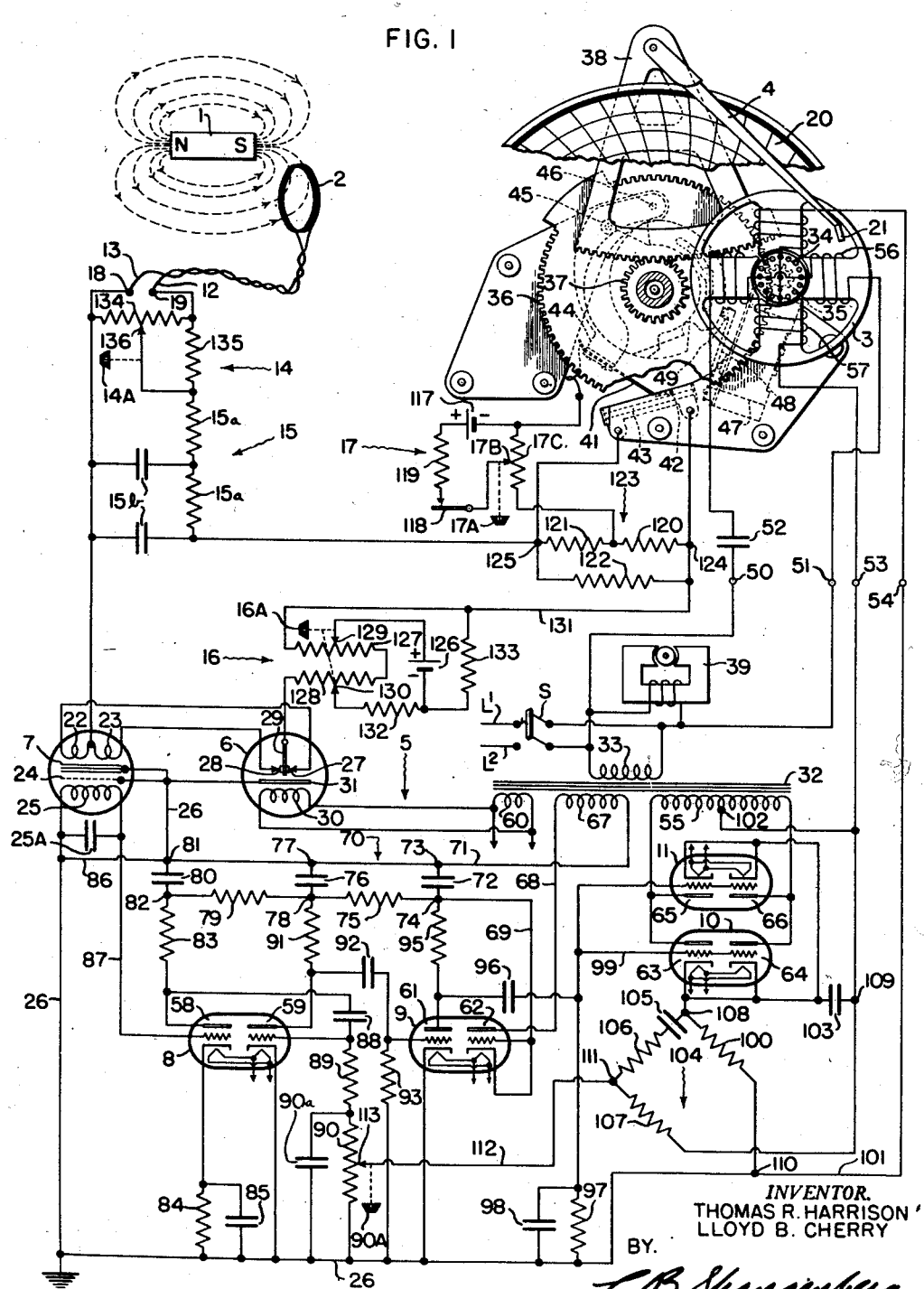
Fig. 1 is a diagrammatic representation of one embodiment of the present invention.

In Fig. 1 of the drawings we have illustrated, more or less diagrammatically, an arrangement for detecting and visually exhibiting and recording the number of lines of induction in a magnetic field produced by a dipole 1. For the purposes of the present invention the nature of the body constituting the dipole 1 is immaterial. Thus, the dipole 1 may comprise an ordinary bar magnet, a ship at sea which exhibits magnetic properties, or the earth itself.

The presence of the dipole 1 is detected by moving a conductor of electricity with respect to it to generate an electromotive force in said conductor which may be measured by suitable means, to be described, to provide an indication of the field strength about the dipole, or in other words the number of lines of induction existing in the path traversed by the conductor, as well as of the presence of the dipole. Specifically, an exploring coil 2 which may comprise about 800 turns of wire is subjected to the magnetic field established by the dipole 1, and relative motion between the dipole and coil is effected in any convenient manner to cause the coil 2 to cut the lines of induction about the dipole. It is immaterial whether both the dipole and coil are moved to accomplish such cutting of flux or whether one of said elements is held stationary and the other is moved. Regardless of how the flux cutting is accomplished an electromotive force is generated in the coil 2 according to the well known formula $$e = \frac{N d\phi}{dt}$$

where $e$ is the generated electromotive force, $N$ is the number of turns making up coil 2 and $$\frac{d\phi}{dt}$$

is the rate at which the lines of induction about the dipole 1 are cut by the coil 2.

It should be observed that when the rate of travel of the dipole and coil past each other is high the electromotive force generated in coil 2 will also be high, at least in comparison to the electromotive force generated in the coil when the rate of relative travel is low. While the generated electromotive force is higher in the first case than in the second, it is to be noted that the higher electromotive force will be of relatively short duration compared to that of the lower electromotive force. Advantage is taken of this relation between the magnitude of the electromotive force generated in coil 2 and its duration by means of the present invention to obtain a measure of the total number of lines of induction about the dipole 1 irrespective of the rate of relative travel of these components past each other. It is evident that the total number of lines of induction cut by the coil 2 when moved relatively to the dipole 1 will be the same regardless of whether the rate of relative travel is low or high. Hence, the indication or record obtained of the total number of lines of induction about the dipole should be the same in each case.

Stated briefly, advantage is taken of the characteristic relation between the magnitude of the generated electromotive force and its duration by providing a reversible electrical motor, designated by the reference numeral 3, to adjust an exhibiting element, designated 4, and by providing an associated motor control system 5 to control the operation of the motor 3 in such manner that its speed varies linearly with the magnitude of the generated electromotive force. Consequently, when the generated electromotive force derived in coil 2 is large but of short duration the motor 3 will operate at high speed for a correspondingly short interval, and when the generated electromotive force is small but of longer duration, the motor 3 will operate at a slower speed for a correspondingly longer interval. It will be recognized by those skilled in the art that when the speed of the motor 3 varies in a linear manner with respect to the variations in magnitude of the generated electromotive force, the total number of revolutions made by the motor shaft will be the same in each case, the total number of lines of induction cut by coil 2 being the same, and hence, the deflection of the exhibiting element 4 will be the same in each case.

The phenomenon giving rise to an electromotive force in coil 2 as it cuts the lines of induction established about the dipole 1 is well known and hence requires no explanation herein. Suffice it to say that as the coil 2 moves in one direction completely through the magnetic field about dipole 1, an electromotive force is produced in coil 2 which gradually increases from zero in one direction to a maximum value, thereafter gradually decreases to zero again, builds up in the opposite direction to a maximum value, and then decreases to zero again. The time required for the generated electromotive force to complete such cycle of variation thus is dependent upon the speed of travel of dipole 1 and coil 2 past each other. In some cases it obviously may be of short induction, for example, of the order of seconds or even fractions of a second, and in other cases it may be of longer duration such as of the order of minutes, hours or days.

The manner in which the electromotive force generated in coil 2 as a result of its motion relative to dipole 1 is utilized to so control the speed of operation of motor 3 will now be described.

Referring to Fig. 1 of the drawings, it will be noted that the motor control system 5 includes a vibrator or equivalent device 6, a transformer 7, amplifying vacuum tubes 8 and 9, and motor drive tubes 10 and 11. The electromotive force generated in coil 2, as it moves past the dipole 1 or as the latter moves past it, is impressed on the vibrator 6 by means of a pair of conductors 12 and 13 and an electrical network made up of four independent sections designated by the reference numerals 14, 15, 16 and 17, and is translated by the vibrator into a pulsating potential of the same polarity. As shown, the terminals of coil 2 are connected by conductors 12 and 13 to the input terminals 18 and 19 of the network section 14. The pulsating potential created by the vibrator is converted into an alternating potential of one phase or of opposite phase depending upon the polarity of the generated electromotive force and is amplified by the transformer 7, and is further amplified by the vacuum tubes 8 and 9. The output from the vacuum tubes 8 and 9 is impressed on the input circuit of the motor drive vacuum tubes 10 and 11 and operates to control the conductivity of the latter as required to effect selective operation of the reversible motor 3 for rotation in one direction or the other according to the polarity of the electromotive force generated in coil 2 and at a rate of speed directly proportional to the magnitude of said generated electromotive force. The motor 3 is employed to adjust the exhibiting element 4 relatively to a circular chart 20 which may desirably be calibrated directly in terms of magnetic lines of induction or flux. The exhibiting element 4 preferably carries a fountain pen 21 on its free end which engages the chart 20 and makes a permanent record of the deflections in position imparted to the exhibiting element 4 by the motor 3. If desired, a suitably calibrated indicating scale may be arranged in cooperative relation with the exhibiting element 4 in addition to or in lieu of the chart 20.

As diagrammatically shown, the primary winding of the transformer 7 comprises two sections 22 and 23 which have their adjacent ends connected together and to the input terminal 18 of the network section 14, which terminal is connected by conductor 13 to one terminal of the exploring coil 2. The core structure and casing of the transformer 7 and a shield 24 interposed between the transformer primary windings and its secondary winding 25 are connected to a grounding conductor 26. The remote ends or terminals of the primary winding sections 22 and 23 are connected to the stationary contacts 27 and 28, respectively, of the vibrator 6. The latter comprises a vibrating reed 29 carrying a contact moved by the vibration of the reed back and forth between the contacts 27 and 28 which it alternately engages.

The reed 29 is connected by means of the network sections 16, 17, 15 and 14 to the other input terminal 19 of the network section 14, which input terminal is connected by the conductor 12 to the other terminal of the exploring coil 2, and is caused to vibrate by a winding 30 having its terminals connected to a source of alternating current. A permanent magnet 31 is associated with the reed 29 for polarizing and synchronizing purposes. In operation the reed 29 is in continuous vibration with a frequency corresponding to that of the source of energization or the winding 30. In consequence, the pulsating currents flowing alternately through the winding sections 22 and 23 creates an alternating voltage in the secondary winding 25 of the transformer 7 which is in phase with or 180° out of phase with the source of energization for the winding 30 depending upon the direction of the pulsating currents alternately flowing through the transformer primary windings 22 and 23, and the magnitude of which corresponds to the magnitude of said pulsating currents. The alternating voltage so created in the transformer secondary winding 25 is well adapted for amplification by the electronic amplifying and control apparatus which has its input terminals connected to the terminals of the transformer secondary winding 25.

Said electronic apparatus comprises an amplifying section including the vacuum tubes 8 and 9 and a motor drive section including the tubes 10 and 11 and motor 3, both of which sections receive energizing current from a transformer 32 having a line voltage primary winding 33 connected to the alternating current supply conductors $L^1$ and $L^2$ through a double pole-single throw switch S.

Figure 2:
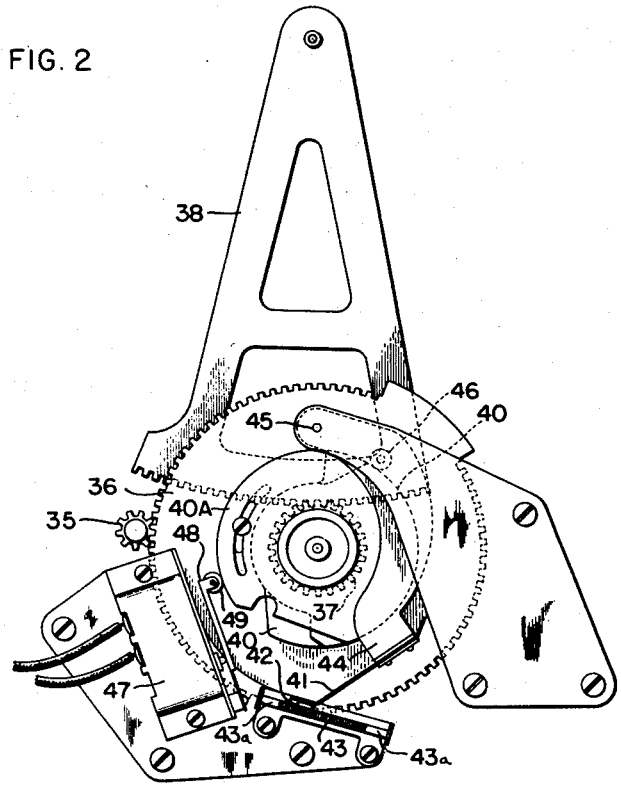
Fig. 2 illustrates in detail the slidewire and switch adjusting mechanism of Fig. 1.

The motor 3, as diagrammatically shown in Fig. 1 and in more detail in Fig. 2, comprises a rotor 34 having its shaft mechanically rigid with a pinion 35 which meshes with and drives a gear 36. The gear 36 carries a gear 37 which meshes with a gear sector 38 which, in turn, operates the exhibiting element or pen arm 4 for recording on the chart 20 the number of lines of induction cut by the exploring coil 2. The chart 20 is rotated at a constant speed by a chart drive motor 39. The motor 39 is a constant speed unidirectional electric motor and is supplied with alternating current from alternating current supply lines $L^1$ and $L^2$.

The gear 36 also carries a suitably configured cam 40 which rotates in unison with the gear 36 and operates to impart lateral movement to a resilient contact arm 41 and thereby adjusts a contact 42 along the length of a short slidewire resistance 43. To this end the resilient contact arm 41 is mounted on the end of a lever 44 which is pivoted at 45 and is provided with a part 46 which bears against the cam surface of the cam 40. Lever 44 is biased for rotation in a counter-clockwise direction by gravity as seen in Fig. 1 and also by suitable spring means, not shown. The short slidewire resistance and associated contact 43 are provided to create a restoring potential to insure that the exhibiting element or pen arm 4 will be returned to a predetermined zero position within its range of movement when no lines of induction are cut by the exploring coil 2. The manner in which this result is accomplished is explained more in detail hereinafter.

The gear 36 carries a second cam 40A of suitable configuration for operating a switch 47, which may be of the type known as microswitches, whenever the exhibiting element or pen arm 4 is deflected away from the aforementioned predetermined zero position along the path traversed by it. In order to attain this operation, a resilient arm 48 is rigidly supported at one end by the switch 47 and is provided with a roller 49 at its other end which bears against the cam surface of the cam 40A. The switch 47 and the mechanism therewith associated constitutes a control means for operating an audible or visual signal, which may be series connected with switch 47 and the supply mains, or for accomplishing any other control effect whenever the exhibiting element or pen arm 4 deflects in one direction or the other away from a predetermined position. It will be understood that, if desired, the control switch 47 may be arranged to be operated when the exhibiting element or pen arm has departed a predetermined distance from its zero position to thereby effect a control operation or to actuate an alarm to indicate that the number of lines of induction cut by the exploring coil 2 exceeds a predetermined number. Preferably, the cam 40A is made adjustable so as to permit variation in said predetermined distance.

The motor 3 has a pair of terminals 50 and 51 connected through a condenser 52 of suitable value to the alternating current supply conductors L¹ and L², and has a second pair of terminals 53 and 54 connected respectively to the mid-point of the secondary winding 55 of transformer 32 and to the grounding conductor 26. For its intended use, the motor 3 may be of the form schematically shown in the drawing in which one pair of oppositely disposed field poles are surrounded by a winding 56 connected between the motor terminals 50 and 51, and the other pair of poles are surrounded by a winding 57 connected between the motor terminals 53 and 54.

Due to the action of condenser 52, the current flowing through the motor winding 56 will be in phase with the voltage of the alternating current supply conductors L¹ and L². The current supplied to the winding 57 will lead or lag by approximately 90° the voltage of the alternating current supply conductors L¹ and L². The windings 56 and 57 thus establish fields in the rotor 34 which are displaced from one another by approximately 90° in one direction or the other, depending upon whether the winding 57 is energized with current which leads or lags by approximately 90° the voltage of the alternating current supply conductors L¹ and L². As will become apparent from the subsequent description, the phase of the current flow through the winding 57 and the direction of rotation of the rotor 34 depends upon, and is controlled by, the polarity of the electromotive force generated in the coil 2. The duration of that rotor rotation depends upon the duration of the electromotive force generated in coil 2, and the speed of rotor rotation depends upon the magnitude of the generated electromotive force.

The alternating voltage created in the secondary winding 25 of the transformer 7 is amplified through the action of the amplifying tubes 8 and 9 and the amplification thus effected is utilized in energizing the phase winding 57 of the motor 3 to control the selective actuation of the latter for rotation of the rotor 34 in one direction or the other at a speed proportional to the magnitude of said alternating voltage.

As shown, the electronic amplifying tube 8 includes two heater type triodes enclosed in the same envelope and designated by the reference characters 58 and 59. The triode 58 includes anode, control electrode, cathode and heater filament elements, and the triode 59 includes like elements. The filaments of triodes 58 and 59 are connected in parallel and receive energizing current from the low voltage secondary winding 60 of the transformer 32. The conductors through which the secondary winding 60 supplies current to the heater filaments of the vacuum tubes 8 and 9 and also to the heater filaments of the motor drive tubes 10 and 11 have been omitted to simplify the drawing.

The electronic amplifying tube 9 includes two heater type triodes, designated by the reference characters 61 and 62, and enclosed in the same envelope. Both of the triodes of tube 9 include anode, control electrode, cathode and heater filament elements. Each of the motor drive tubes 10 and 11 includes two heater type triodes which are enclosed in the same envelope and include anode, control electrode, cathode and heater filament elements. The triodes in tube 10 have been designated by the symbols 63 and 64 while the triodes in tube 11 have been designated by the symbols 65 and 66.

The triode 62 of the vacuum tube 9 is utilized as a half wave rectifier providing direct current voltage for energizing the anode or output circuits of the triodes 58, 59 and 61. As shown, the control electrode and cathode of the triode 62 are directly connected to each other and the output circuit thereof is energized by the secondary winding 67 of transformer 32 through a circuit which may be traced from the left end terminal of winding 67, as seen in the drawing, through a conductor 68 to the anode of triode 62, the cathode thereof, and through a conductor 69 to the positive terminal of a filter generally designated by the reference numeral 70. The negative terminal of filter 70 is connected by a conductor 71 to the right end terminal of the transformer secondary winding 67.

The filter 70 includes a condenser 72 which operates to smooth out the ripple in the output voltage of the filter between the points 73 and 74. The filter 70 also includes a resistance 75 and a condenser 76 which operate to smooth out the output voltage of the filter between the points 77 and 78. The filter 70 includes a further resistance 79 and condenser 80 for smoothing out the output voltage between the filter points 81 and 82. The filter, therefore, comprises three stages. Such a three-stage filter is provided because for satisfactory and efficient operation it is desirable that the anode voltage supplied to triode 58 be substantially free from ripple whereas it is not necessary to supply anode voltage so completely free from ripple to the output circuit of the triode 59. Likewise, it is not necessary to supply anode voltage as free from ripple to the triode 61 as to the triode 59.

The anode circuit of the triode 58 may be traced from the filter point 82, which comprises the positive terminal of the filter, through a fixed resistance 83 to the anode of the triode 58, to the cathode thereof, and through a cathode biasing resistance 84 which is shunted by a condenser 85, to the negative filter point 73 through the previously mentioned grounded conductor 26 and a conductor 86. The cathode biasing resistance 84 and the parallel connected condenser 85 are utilized for biasing the control electrode of the triode 58 negatively with respect to the cathode.

The input circuit of the triode 58 may be traced from the cathode to the parallel connected resistance 84 and condenser 85 through the transformer secondary winding 25, and a conductor 87 to the control electrode of the triode 58. As shown, a tuning condenser 25A of suitable value is connected in parallel to the transformer secondary winding 25.

The output circuit of the triode 58 is resistance capacity coupled to the input circuit of the triode 59 by means of a condenser 88 and two series connected resistances 89 and 90. Specifically, the anode of the triode 58 is connected by the condenser 88 to the control electrode of triode 59 and the control electrode of the triode 59 is connected through the two series connected resistances 89 and 90 to the cathode of the triode 59. The anode circuit of the triode 59 may be traced from the positive terminal 78 of the filter 70 through a fixed resistance 91 to the anode of the triode 59, the cathode thereof, and conductors 26 and 86 to the negative terminal of the filter.

The output circuit of the triode 59 is resistance capacity coupled to the input circuit of the triode 61 by means of a condenser 92 which is connected between the anode of the triode 59 and the control electrode of the triode 61, and by means of a resistance 93 which is connected between the control electrode of the triode 61 and the cathode thereof. It is noted the resistances 89 and 90 in the input circuit of triode 59 and the resistance 93 in the input circuit of triode 61 operate to maintain the control electrodes of the triodes 59 and 61 at the same potentials as their associated cathodes when no voltage is induced in the transformer secondary winding 25, and upon the induction of an alternating voltage in the secondary winding 25, the resistances 89, 90 and 93 permit the flow of grid current between the control electrodes of the triodes 59 and 61 and their associated cathodes and thereby limit the extent the control electrodes of the triodes are permitted to go positive with respect to their associated cathodes.

The anode circuit of the triode 61 may be traced from the positive terminal 74 of the filter 70 through a fixed resistance 95 to the anode of the triode, the cathode thereof, and conductors 26 and 86 to the negative terminal 73 of the filter. The output circuit of the triode 61 is resistance capacity coupled to the input circuits of the triodes 63, 64, 65 and 66 by means including a condenser 96 and a parallel connected resistance 97 and condenser 98. The condenser 96 is connected by a conductor 99 to the control electrodes of all of the triodes 63, 64, 65 and 66, and is connected to the cathodes of all of said triodes by means of the parallel connected resistance 97 and condenser 98, and a cathode biasing resistance 100. As will be apparent, the signal voltage from the output circuit of the triode 61 is impressed simultaneously and equally on all four of the control electrodes of the triodes 63, 64, 65 and 66.

Anode voltage is supplied the output circuits of the triodes 63, 64, 65 and 66 from the high voltage secondary winding 55 of the transformer 32. The anodes of the triodes 63 and 65 are both connected to the left end terminal of the transformer secondary winding 55 and the anodes of the triodes 64 and 66 are both connected to the right end terminal of that winding 55. The cathodes of the triodes 63, 64, 65 and 66 are all connected together and through the cathode biasing resistance 100 and a conductor 101 to the terminal 54 of the reversible motor 3. The terminal 53 of the motor 3 is connected to a center tap 102 of the transformer secondary winding 55. Thus, the triodes 63, 64, 65 and 66 are utilized to supply energizing current to the phase winding 57 of the motor 3. It will be noted that this energizing circuit comprises two parallel branches, one including the left end section of transformer secondary winding 55 and the parallel connected anode circuits of triodes 63 and 65, and the other including the right end section of winding 55 and the parallel connected anode circuits of triodes 64 and 66.

Parallel connected triodes 63, 65 and 64, 66 are provided in the motor drive stage to diminish the possibility of failure of the apparatus to function due to failure of one of the motor drive tubes 10 and 11. It is unlikely that both tubes 10 and 11 will fail at the same time and since one triode of each parallel connection is contained in a different one of the tubes 10 and 11, failure of either tube will not result in failure of the apparatus, as a whole, to function. In addition, the use of the parallel connected triodes makes increased torque from motor 3 available.

The motor 3 is preferably so constructed that the impedance of the winding 57, together with that of a condenser 103, is of the proper value to match the impedance of the parallel connected anode circuits of the triodes 63, 65 and 64, 66, when the motor is operating, in order to obtain the most efficient operation. Preferably, the motor is so constructed that it has a high ratio of inductance to resistance, for example, of the order of from 6-1 to 8-1 at the frequency of the energizing current supplied to it. This provides for maximum power during the running condition of the motor with the least amount of heating, and also provides a low impedance path for braking purposes.

As noted hereinbefore, energizing current is supplied to the motor winding 56 from the alternating current supply conductors $L^1$ and $L^2$ through the condenser 52. The condenser 52 is so selected with respect to the inductance of the motor winding 56 as to provide a series resonant circuit having a unity power factor. By virtue of the series resonant circuit, the total impedance of the motor winding 56 is substantially equal to the resistance of the winding, and since this resistance is relatively low, a large current flow through the winding 56 is made possible. This permits the attainment of maximum power and torque from the motor 3. In addition, the current flow through the motor winding 56 is in phase with the voltage of the alternating current supply conductors L¹ and L² because of the series resonant circuit. The voltage across the motor winding 56, however, leads the current by substantially 90° because of the inductance of the winding 56.

As will now be apparent, energizing current is supplied the motor winding 57 from the transformer secondary winding 55 through the anode circuits of the triodes 63, 64, 65 and 66. The condenser 103 is connected in parallel with the motor winding 57 and is so chosen as to provide a parallel resonant circuit having unity power factor. This parallel resonant circuit presents a relatively high external impedance and a relatively low local circuit impedance. The relatively high external impedance is approximately the same as the impedance of the anode circuits of the parallel connected triodes 63, 65 and 64, 66, and hence, provides efficient operation. The relatively low internal circuit impedance approximates the actual resistance of the winding 57, and since this resistance is relatively low, the impedance of the local circuit is also relatively low.

For the first half cycle of the alternating voltage produced across the terminals of the transformer secondary winding 55, the anodes of the triodes 63 and 65 are rendered positive with respect to the center tap 102, and during the second half cycle, the anodes of triodes 64 and 66 are made positive with respect to the center tap 102. Accordingly, the pairs of triodes 63, 65 and 64, 66 are arranged to conduct on alternate half cycles of the alternating current supplied by the supply conductors L¹ and L².

When no signal or grid bias is impressed on the control electrodes of the triodes 63, 64, 65 and 66, pulsating unidirectional current of twice the frequency of the alternating voltage supplied by conductors L¹ and L² is impressed on the motor winding 57. When thus energized the motor 3 is not urged to rotation in either direction but remains stationary. Due to the relatively high direct current component of the current then flowing through the motor winding 57, the core structure of the motor 3 tends to become saturated whereby the inductive resistance of the motor winding 57 is relatively small. The condenser 103 is shunt to the motor winding 57 and the cathodes biasing resistance 100 are so chosen that the condenser 103, resistance 100 and motor winding 57 then form a parallel resonant circuit. This saturation of the core structure of the motor 3 operates to exert a damping effect on the rotor 34 of the motor, or in other words, an effect tending to retard rotation of the rotor 34. Consequently, if the rotor 34 has been rotating, saturation of the motor core structure operates to quickly stop the rotation.

When an alternating signal voltage is impressed on the control electrodes of the triodes 63, 64, 65 and 66, the magnitude of the pulses of current flowing in the anode circuits of one of the pairs of triodes 63, 65 or 64, 66 will be increased while the magnitude of the pulses of current flowing in the anode circuits of the other pair of triodes will be decreased. Accordingly, the pulses of unidirectional current supplied to the motor winding 57 during the first half cycle will predominate over those supplied the motor winding during the second half cycle. While current pulses will be increased depends upon whether the alternating signal voltage is in phase with or 180° out of phase with the voltage of the supply conductors L¹ and L².

Such energization of the motor winding 57 operates to introduce therein an alternating component of current of the same frequency as that supplied by the alternating current supply conductors L¹ and L². This alternating component of current will either lead or lag by 90°. The alternating current flowing through the motor winding 56 depending upon which of the two pairs of triodes 63, 65 or 64, 66 have their anode currents increased by the prevailing alternating signal voltage, and with either phase relation the two currents produce a magnetic field in the motor core structure which rotates in one direction or the other, depending upon said current phase relation, and effects rotation of the motor rotor 34 in the corresponding direction. Moreover, when the motor winding 57 is so energized, the direct current component of the current flowing therein is decreased, and consequently, the saturation of the motor core structure is decreased with the result that the rotor damping effect is reduced.

In normal operation, the alternating signal voltage impressed on the control electrodes of the triodes 63, 64, 65 and 66 through their connection by conductor 99 and condenser 96 to the anode circuit of the triode 61, is dependent in magnitude and direction upon the magnitude and direction of the pulsating current flow through the detector circuit including the exploring coil 2, vibrator 6, and the primary winding sections 22 and 23 of the transformer 7.

When no electromotive force is generated in the exploring coil 2, no alternating signal voltage is normally transmitted to the control electrodes of the triodes 63, 64, 65 and 66 from the anode circuit of triode 61, and the rotor 34 of the motor 3 has no tendency to rotate. When this zero input condition is disturbed, due to the generation of an electromotive force of one polarity in the exploring coil 2, the motor 3 will rotate in the direction to move the exhibiting element 4 in one direction. Conversely, when the zero input condition is disturbed as a result of the generation of an electromotive force of the opposite polarity in the exploring coil 2, the motor 3 will give the exhibiting element 4 an adjustment in the opposite direction. In the operation of the apparatus, the rotation of the motor 3 is substantially contemporaneous with the detector current flow which is indicative of the need for the motor rotation.

Figure 3:
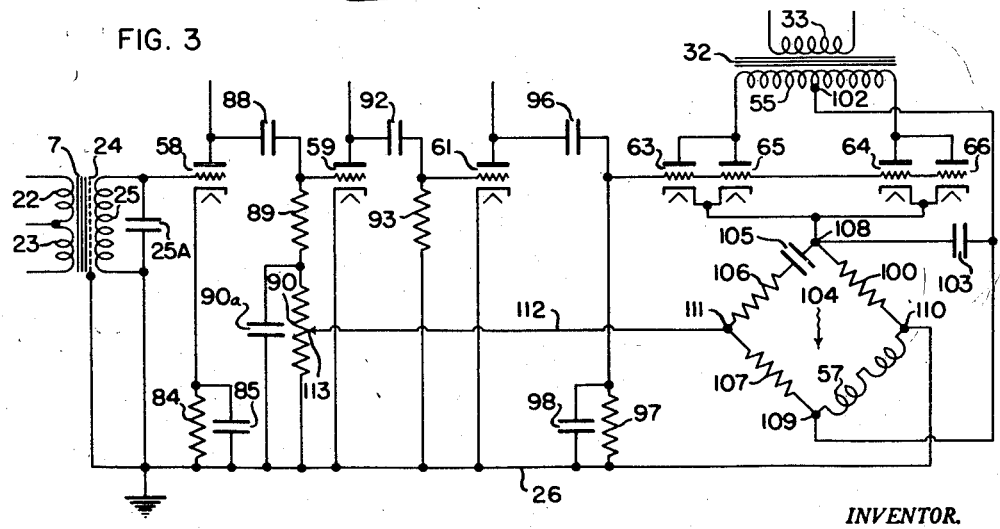
Fig. 3 is a wiring diagram illustrating in simpler manner a portion of the electronic amplifier and motor drive system of Fig. 1.

As will be apparent by reference to Fig. 3, the phase winding 57 of the reversible electrical motor comprises one arm of a bridge network 104. An adjacent arm of the bridge network 104 is comprised of the cathode biasing resistance 100. A third bridge arm includes a condenser 105 and a resistance 106 connected in series while the fourth bridge arm includes a resistance 107. The input terminals of the bridge network 104 have been designated by the reference numerals 108 and 109 which are respectively connected to the cathodes of the triodes 63, 64, 65 and 66 and to the center tap 102 on the transformer secondary winding 55. One output terminal 110 of the bridge network is connected to the grounded conductor 26, and the other output terminal 111 is connected by a conductor 112 to a contact 113 which is adjustable along the length of the resistance 90 connected in the input circuit of triode 59.

The bridge network 104 is employed in order to provide a simple and efficient means to cause the speed of rotation of the motor rotor 34 to vary in a linear manner with the magnitude of the electromotive force generated in the exploring coil 2 over a much wider range of variation of that electromotive force than would be otherwise possible if the bridge network 104 were not provided. For example, we have determined experimentally than when the bridge network 104 is provided, the rotation of the motor 3 may be gradually varied from a standstill condition up to full speed as the electromotive force impressed on the detector circuit including vibrator 6 and the primary winding sections 22 and 23 of the transformer 7 is varied from substantially zero up to approximately 1700 microvolts, whereas the motor will be varied from a standstill condition to full speed as the said electromotive force is varied from substantially zero to 30 microvolts or less when the bridge network 104 is not provided. This wide range of linear response is obtained, moreover, without any significant sacrifice in regard to the input electromotive force required to initiate motor operation, motor rotation being initiated by an electromotive force of 10 microvolts or less.

This result is obtained by deriving from the bridge network 104 a voltage of the same frequency as the voltage of the supply mains L' and L², the magnitude of which is a linear function of the motor speed and the phase of which is determined by the direction of rotation thereof, and by introducing this voltage into the input circuit of triode 59 in opposition to the alternating signal voltage impressed on that input circuit from the output circuit of triode 58.

The bridge network 104 is of a type known in the art as a Hay bridge and includes the fixed resistances 100 and 107 in two diametrically opposed arms and capacitance and inductance, respectively, in each of the other diametrically opposed arms. The inductance is that of the motor winding 57 and the capacitance is that of condenser 105. As previously noted, the bridge arm including condenser 105 includes the fixed resistance 106. The value of condenser 105 is so chosen as to offset, at least to a substantial extent, and if desired, entirely, the effect of the inductance of motor winding 57 so that when the motor rotor 34 is at rest the bridge network 104 is substantially balanced, and hence, little or no unbalanced voltage, useful for extending the range of response of the motor control system 5 to the generated electromotive force of coil 2, appears at the bridge output terminals 110 and 111.

On rotation of the motor rotor 34, an electromotive force of one phase or of opposite phase relatively to the voltage of the supply mains L' and L² and of the same frequency is produced at the bridge output terminals 110 and 111. The magnitude of this electromotive force is dependent upon and varies in a linear manner with the speed of rotation of the rotor 34, and is impressed through conductors 26 and 112 across a portion of the resistance 90 depending upon the adjustment of contact 113. The said electromotive force is so fed back to the resistance 90 as to oppose the fluctuating electromotive force produced across the latter as a result of the production of an electromotive force in the exploring coil 2. The amount of the said electromotive force which is fed back may be adjusted by manipulation of contact 113 along resistance 90.

The precise manner in which an electromotive force is produced at the bridge output terminals 110 and 111 upon motor rotation is not now known to us, but it is believed to be a complex quantity created by two effects, one of which is due to transformer action between the motor windings 56 and 57 and the other of which is due to change in impedance of the winding 57. These two effects are additive, since the electromotive force created at the bridge output terminals 110 and 111 by one of the effects augments the electromotive force there produced by the other effect.

The transformer action effect will be first explained. Since the motor windings 56 and 57 are displaced 90° with respect to each other on the core structure of the motor, no lines of magnetic flux established by the winding 56 link any turns of the winding 57 when the rotor 34 is stationary, and hence, no electromotive force is then induced in winding 57 as a result of transformer action between windings 56 and 57. Upon rotation of the rotor 34, however, the magnetic flux established by the winding 56 is distorted whereupon some lines of said magnetic flux link the turns of winding 57 to induce an electromotive force in the latter of the same frequency as the voltage supplied by mains L' and L². The induction of this electromotive force in winding 57 causes an electromotive force of the same frequency to appear at the bridge output terminals 110 and 111. The magnitude and the phase of this electromotive force relatively to the voltage of the supply mains L' and L² varies in accordance with the speed of rotation of the rotor 34 and the direction of rotation thereof, respectively, inasmuch as the extent of distortion of the magnetic field of winding 56 is dependent upon the speed of rotation of rotor 34 and the direction of distortion is determined by the direction of rotor rotation.

The manner in which a component of electromotive force is produced at the bridge output terminals 110 and 111 upon motor rotation due to change in impedance of the winding 57 brought about by such rotation will now be explained. As noted hereinbefore, the constants of the bridge network 104 are so chosen that at the frequency of the voltage supplied by supply conductors L' and L², the bridge network 104 will be exactly balanced. The value of condenser 105 is then effective to cancel out the inductive effect of motor winding 57. Upon motor rotation, however, the effective coupling between the motor windings 56 and 57 is changed and this effective change in coupling produces an apparent change in inductance and also in resistance of winding 57. At such new apparent value of inductance and resistance of winding 57 the condenser 105 is not operative to balance the bridge network to the same extent as when the motor is at rest, and hence, the bridge network 104 becomes unbalanced. The extent of bridge network unbalance which is accomplished in this manner varies in accordance with the speed of rotation of the rotor 34 since the apparent change in impedance of winding 57 is dependent upon the speed of rotation of rotor 34. The change in inductance of winding 57 with motor rotation is always in the same direction regardless of the direction of rotor rotation, and hence, the bridge network is unbalanced in the same direction irrespective of the direction of motor rotation.

Although the bridge network 104 is always unbalanced in the same direction regardless of the direction of motor rotation, such unbalance is nevertheless operative to cause the production of an electromotive force in phase with the voltage of the supply lines L' and L² to appear at the bridge output terminals 110 and 111 upon rotation of the motor in one direction, and to cause the production of an electromotive force of the opposite phase at the bridge output terminals upon rotation of the motor in the opposite direction. Such phase shift upon reversal in the direction of motor rotation is produced because pulsating voltage in phase with the voltage of the supply mains L' and L² is impressed on the bridge input terminals 108 and 109 when an electromotive force of one polarity is impressed on the detector circuit including vibrator 6 and the primary winding sections 22 and 23 of the transformer 7, and pulsating voltage of the opposite phase is impressed on the bridge input terminals when an electromotive force of the opposite polarity is impressed on that detector circuit. In the first case the motor 3 is energized to rotation in one direction, and in the second case the motor is energized to rotation in the opposite direction. Consequently, the same change in impedance of motor winding 57 produces an electromotive force of one phase at the bridge output terminals 110 and 111 when the motor is energized for rotation in one direction and produces an electromotive force of opposite phase at the bridge output terminals when the motor is energized for rotation in the opposite direction.

As those skilled in the art will recognize, the bridge network 104 is of a type which may be exactly balanced only at one frequency of the energizing electromotive force impressed on its input terminals. In practice, the bridge components are so chosen that the bridge network is balanced when fluctuating voltage of the frequency of the supply mains L' and L² is impressed on its input terminals 108 and 109. In the arrangement of Figs. 1 and 2 the voltage impressed on the bridge input terminals 108 and 109 also includes a component of twice the frequency of the voltage supplied by conductors L' and L², and accordingly, an electromotive force of this higher frequency will be produced at the bridge output terminals 110 and 111 and will be impressed through the feedback conductors 26 and 112 across the resistance 90 in the input circuit of triode 59 even when the rotor 34 of motor 3 is at rest. This higher frequency component is not effective to actuate motor 3 for rotation, however, since the motor drive stage including triodes 63, 64, 65 and 66 and the transformer secondary winding 55 is of a frequency discriminating type and will not respond to voltages of twice the frequency of that supplied by the supply conductors L' and L² for energizing motor 3 to rotation.

Figure 4:
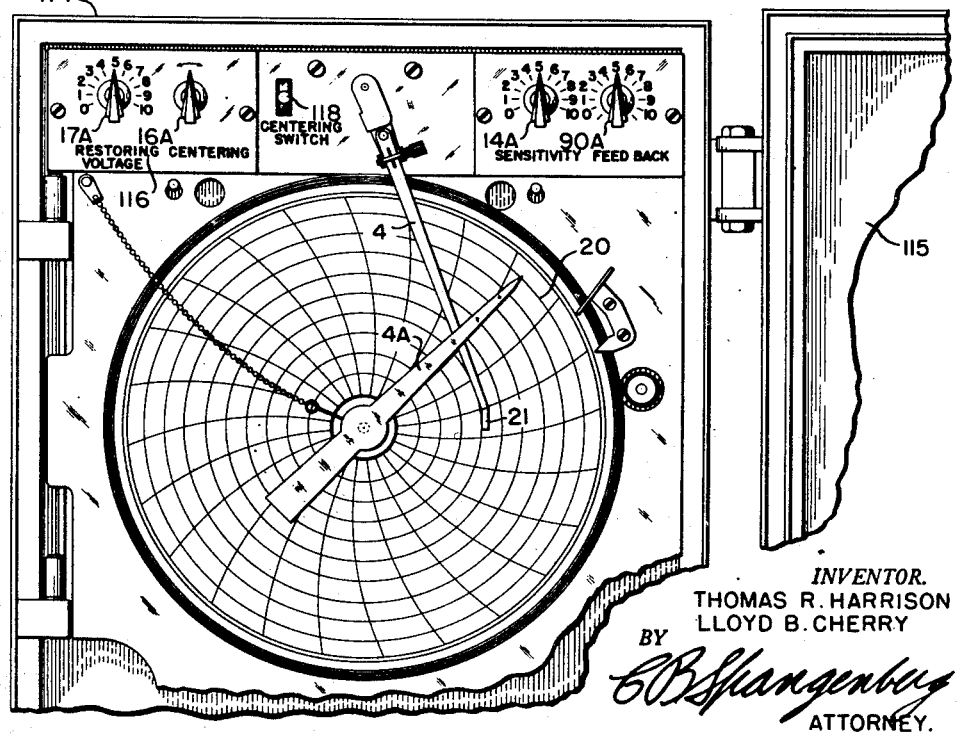
Fig. 4 is a partial front view of the apparatus of Fig. 1 showing the arrangement of the various adjustments.

As may be seen by reference to Fig. 4 which shows a partially broken away front view of a practical embodiment of our invention, the apparatus shown in diagrammatic manner in Figs. 1 and 3 may be so constructed that certain of its functions can be easily varied, as desired, by an attendant. The instrument shown in Fig. 4 comprises a rectangular casing 114 which contains all of the various apparatus components except the exploring coil 2. Ordinarily the exploring coil 2 is located at a position remote from the remainder of the apparatus. The casing 114 is provided with a door 115 which is hinged in any convenient manner to the casing 114 and is provided with suitable gaskets and arranged as required to keep the interior of the casing dry even when the instrument is subjected to spray for extended periods. An indicating pointer designated by the reference character 4A and driven by the reversible motor 3 in unison with the exhibiting element or pen arm 4 so as to make substantially one complete revolution as the element 4 moves over its range of movement may also be provided as shown.

On the upper panel 116 just inside the splashproof door 115 there are four control dials and a switch. The first control dial on the left, as seen in Fig. 4, has been designated by the reference symbol 17A and is marked "Restoring Voltage." This control dial controls the energizing voltage impressed on the short slidewire resistance 43 of the electrical network section 17 from a battery 117, as may be seen in Fig. 1. Battery 117, which may be an ordinary dry cell, has its positive terminal connected through a resistance 119 to one terminal of a switch 118. The other terminal of switch 118 is connected to a contact 17B which is in slideable engagement with a slidewire resistance 17C. The upper terminal of slidewire resistance 17C, as seen in the drawing, is connected to the negative terminal of battery 117 and also to the resilient arm 41 which carries the slidewire contact 42 on the end thereof. The lower end of resistance 17C is connected to the adjacent terminals of a pair of equal resistances 120 and 121 which are connected in series between the terminals of the slidewire resistance 43. A resistance 122, connected in parallel to the slidewire resistance 43 and also the series connected resistances 120 and 121, is also provided in the electrical network section 17. The control dial 17A is provided to facilitate adjustment of contact 17B along the length of slidewire resistance 17C and thereby to facilitate adjustment of the potential drop impressed across the slidewire resistance 17C from the battery 117.

It will be noted that the slidewire resistance 43 and the series connected resistances 120 and 121 comprise a bridge network 123 the input terminals of which comprise the contact 42 in engagement with the slidewire resistance 43 and the point of connection of the adjacent ends of resistances 120 and 121. The output terminals comprise the remote ends 124 and 125 of resistances 120 and 121 and are shunted by the resistance 122. When the contact 42 is in a central position along the length of the slidewire resistance 43, a position corresponding to the zero position of the exhibiting element or pen arm 4, the bridge 123 is balanced and the potentials of the bridge output terminals 124 and 125 are identical.

Upon rotation of the motor 3 in one direction and consequent deflection of the contact 42 in a corresponding direction along slidewire resistance 43, however, a unidirectional electromotive force of one polarity is produced between the bridge output terminals 124 and 125. This unidirectional electromotive force is of a polarity tending to effectuate rotation of the motor 3 in the proper direction to restore the exhibiting element or pen arm 4 to its zero position. Consequently, if the electromotive force which gave rise initially to the motor operation, namely that generated in exploring coil 2, should decrease to zero in such manner that the exhibiting element or pen arm 4 is left in a deflected position, the restoring voltage derived from the bridge network 123 will operate to restore the said exhibiting member 4 to its zero position.

It will be evident that upon rotation of the motor 3 in the opposite direction and resulting deflection of the contact 42 in the opposite direction along slidewire resistance 43 from its zero position, an electromotive force of opposite polarity will be produced between the bridge network output terminals 124 and 125. This unidirectional electromotive force is of the proper polarity to tend to restore the exhibiting member 4 to its zero position from its then deflected position and will accomplish that result if the generated electromotive force in coil 2 decreases to zero while the said exhibiting member is in a deflected position.

Accordingly, the network section 17 including the short slidewire resistance 43 and associated contact 42 driven by motor 3 ensures the proper return of the exhibiting member 4 to its zero position along the chart 1. In this connection it will be noted that by employing a cam 40 of proper configuration for imparting lateral motion to the contact 42 relatively to the slidewire resistance 43, the contact 42 may be moved over the entire length of slidewire resistance 43 upon only slight departure of the exhibiting element or pen arm 4 from its zero position, for example, upon departure of approximately ten percent of the full scale travel of the member 4. To this end the slidewire resistance 43 is preferably provided with relatively long terminals 43a so as to permit slight motion of the contact 42 relatively to the slidewire resistance 43, when the contact is in its extreme deflected positions, without causing any change in the restoring voltage.

As those skilled in the art will recognize, the restoring voltage so obtained and utilized also provides a simple and efficient method of attenuating electromotive force variations of longer period which may be produced in the exploring coil 2 due to the presence of extraneous magnetic fields not under observation or otherwise impressed on the instrument detector circuit.

The control dial 17A, as seen in Fig. 4, is calibrated from 0 to 10 and each division represents 10 microvolts. Hence, if the knob is set on 5, there will be made available 50 microvolts, when the contacts 42 is deflected to either extreme position, for suppressing the electromotive force impressed on terminals 18 and 19 from exploring coil 2 to attenuate undesired long period signals and to bring the exhibiting member 4 back to its zero position in the event the signal under observation fails. Inasmuch as the use of large restoring voltages would not allow the motor 3 to drive beyond the range of the slidewire resistance 43 on small signals and would also attenuate signals of medium period, for example, of the order of 15 seconds, the restoring voltage is preferably always smaller than 100 microvolts. As a result, the rate at which the exhibiting member 4 is restored to its zero position upon failure of the observed signal is generally quite slow. The actual amount of restoring voltage required may be determined experimentally by the operator and adjusted by him to that value required to attenuate the contemporaneous long period signals which are undesired.

The second control dial from the left in Fig. 4 is a vernier rheostat which has been designated by the reference character 16A and is marked "Centering." Its function is to provide a compensating electromotive force to compensate for fixed stray unidirectional electromotive forces which may be introduced into the detector circuit including the vibrator 6 and the primary windings 22 and 23 of the transformer 7, and in this manner to ensure that the exhibiting element or pen arm 4 will be adjusted to its zero position along the chart 20 regardless of the existence of such stray electromotive forces. As may be seen by reference to Fig. 1, the control dial 16A controls the energizing voltage impressed on the detector circuit including elements 5, 22 and 23 from a battery 126 which may comprise an ordinary dry cell similar to the battery 117 and is connected in the electrical network section 16. The dual vernier rheostat is comprised of two resistances 127 and 128 and contacts 129 and 130 which are in slideable engagement with the resistances 127 and 128, respectively. Resistances 127 and 128 are arranged side by side and one pair of adjacent terminals are directly connected, as shown. The other terminal of resistance 127 is connected by a conductor 131 to the output terminal 124 of bridge 123, while the other terminal of resistance 129 is connected to the vibrating element 29 of the vibrator 6. Contact 129 associated with resistance 127 is connected to the positive terminal of battery 126 the negative terminal of which is connected to one terminal of each of a pair of fixed resistances 132 and 133. The other terminal of resistance 132 is connected to the contact 130 associated with resistance 128. The other terminal of resistance 133 is connected to the conductor 131 which connects the bridge output terminal 124 to one terminal of resistance 127.

The control dial 16A preferably has a direct mechanical connection with the contact 130 and has a lost motion connection with the contact 129 so that upon initial movement of the dial the contact 130 is first moved relatively to resistance 128 through a range in which the contact 129 is stationary with respect to resistance 127 and then contact 129 is moved relatively to resistance 127, thereby providing a vernier or fine adjustment and a coarse adjustment. To this end, the resistance 127 is preferably of higher resistance than the resistance 128. Preferably the circuit components 126 through 133 are so chosen in relation to the remainder of the apparatus that the control dial 16A has sufficient latitude to compensate for or balance out at least 6 millivolts of unidirectional stray electromotive force of either polarity.

The third control from the left in Fig. 4 is the switch 118, mentioned heretofore. The switch 118 is connected in the electrical network section 17 in such manner that when depressed it eliminates the restoring voltage from the detector circuit. Switch 118 is provided so that the restoring voltage may be eliminated when the unidirectional stray electromotive forces which may be extraneously introduced into the detector circuit are being compensated for by manipulation of the centering control dial 16A. If the restoring voltage were not eliminated during this compensating adjustment, it would tend to adversely affect that adjustment and might even influence the adjustment to such an extent as to make it impossible of accomplishment. It should be noted that the provision of switch 118 makes it possible to eliminate the restoring voltage from the detector circuit while the compensating adjustment is being made without changing the setting of the control dial 17A.

The next control dial from the left in Fig. 4, designated by the reference symbol 14A, is employed as an attenuator for controlling the magnitude of the electromotive force which is impressed on the detector circuit from the exploring coil 2. This control dial is marked "Sensitivity" and is included in the electrical network section 14 of Fig. 1. The electrical network section 14, as seen in Fig. 1, also includes a slidewire resistance 134 the terminals of which are connected between the instrument input terminals 18 and 19, and also includes a fixed resistance 135. One terminal of resistance 135 is connected to the input terminal 19, and hence, to one terminal of resistance 134, and the other terminal of resistance 135 is connected to a contact 136 which is disposed in slideable engagement with the resistance 134. The last mentioned terminal of resistance 135 and the terminal of resistance 134 which is connected to the input terminal 18 constitute the output terminals of the network section 14.

The electrical network section 14 constitutes a modified "L-Pad" attenuator inasmuch as the values of resistances 134 and 135 are so chosen that the resistance between the output terminals remains substantially constant regardless of the position to which the contact 136 is adjusted along the length of resistance 134. In this manner any desired fraction of the electromotive force impressed on the terminals 18 and 19 may be impressed on the detector circuit including the vibrator 6 and the primary winding sections 22 and 23 of the transformer 7 without causing any change in the resistance of the detector circuit "looking into" the detector circuit from the terminals 18 and 19. It will be noted that the provision of such means for varying the sensitivity of response of the apparatus to the electromotive force impressed on terminals 18 and 19 from the exploring coil 2 does not alter to any significant extent the effect of the restoring and centering voltages upon the operation of the apparatus.

The electrical network section 15 which has been previously referred to comprises a filter made up of suitable resistive and capacitive components designated by the reference characters 15a and 15b, respectively, and is inserted between the output terminals of the electrical network section 14 and the detector circuit for the purpose of filtering out relatively high frequency components of current which may be extraneously induced in the exploring coil 2 or the connecting leads 12 and 13 and which, if not filtered out, would otherwise adversely affect the operation of the apparatus.

The remaining control dial shown in Fig. 4 has been designated by the reference symbol 90A and is marked "Feedback." This control dial is calibrated from 0 to 10 and provides a control to regulate the amount of the output voltage produced by the bridge network 104 which is fed back in opposition to the alternating signal voltage appearing across the resistance 90 connected in the input circuit of the triode 59.

Figure 5:
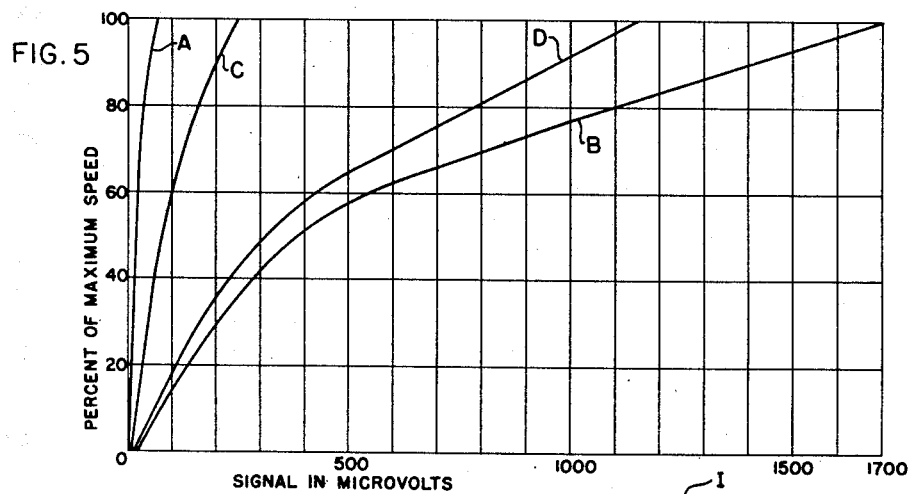
Fig. 5 is a graph showing the relation between the electromotive force derived in the exploring coil of Fig. 1 and the speed of the reversible motor.

The curves of Fig. 5 show the manner in which the range of response of the apparatus may be varied by adjustment of the setting of the feedback control dial 90A. All of these curves were obtained by employing a reversible motor 3 of medium speed which would actuate the exhibiting member 4 over its full range of travel in approximately 11 seconds, and with the restoring voltage control dial 17A set at its zero position.

Referring to the curve A of Fig. 5 it will be noted that with the feedback control dial set at zero so that there is no feedback electromotive force impressed on the input circuit of triode 59 from the output circuit of bridge network 104, the motor 3 reaches full speed with approximately 70 microvolts impressed on the apparatus input terminals 18 and 19. It has been ascertained that if the filter network 15 of Fig. 1 is eliminated that the motor 3 will reach full speed with 30 microvolts or less impressed on the input terminals 18 and 19. As the feedback electromotive force is gradually increased by manipulation of the control dial 90A, the value of the electromotive force impressed on the input terminals 18 and 19 at which the motor 3 reaches full speed is correspondingly increased until, with the control dial 90A set to its maximum feedback position, an input electromotive force of approximately 1700 microvolts is required to cause the motor 3 to operate at full speed. This latter condition is represented by curve B. With the feedback control dial 90A set at 4, full motor speed is obtained with an input electromotive force of approximately 250 microvolts while full motor speed is obtained with an input electromotive force of approximately 1150 microvolts when the said control dial is set at 6, as is represented by the curves C and D, respectively.

Curves A, B, C and D of Fig. 5 show that the speed of motor 3 varies in a substantially linear manner with the electromotive force impressed on the input terminals 8 and 9. Thus, the operating characteristics of the apparatus disclosed in Figs. 1 to 4 are such as to satisfy the essential requirements of a flux indicator and/or recorder, namely, that the motor speed be a linear function of the generated electromotive force in the exploring coil subjected to the magnetic field under observation. This desirable operation is obtained, moreover, without affecting in any significant manner the magnitude of the exploring coil generated electromotive force which is required to initiate motor rotation. Thus, the motor 3 will be actuated to rotation when an electromotive force of the order of 10 microvolts or less is impressed on the apparatus input terminals 18 and 19.

Figure 6:
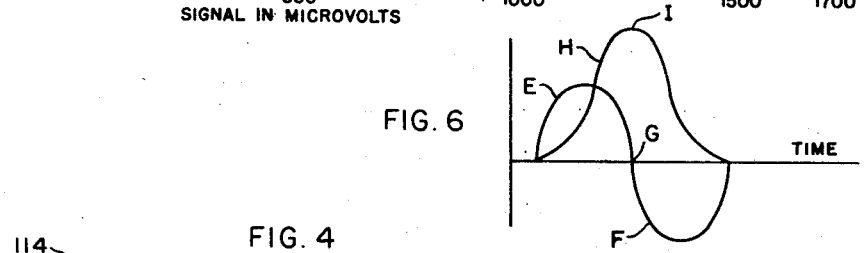
Fig. 6 is a graph showing the manner in which the exhibiting element of Fig. 1 is deflected upon variation in magnitude and polarity of the electromotive force derived in the exploring coil.

Fig. 6 is a graph illustrating the manner in which the exhibiting member 4 is deflected when the exploring coil 2 is moved completely through the magnetic field established by the magnetic member 1. In Fig. 6 the curve E represents the electromotive force generated in the coil 2 as it is moved into the magnetic field about member 1, and curve F represents the generated electromotive force as the motion of coil 2 is continued in the same direction to move the coil 2 out of the region of said magnetic field. When the coil 2 is initially moved into the magnetic field, the polarity of the magnetic field is such as to cause the induction of electromotive force E of one polarity in coil 2. As the motion of coil 2 continues it eventually reaches a position wherein all of the lines of induction of the magnetic field are parallel to the plane of the turns of coil 2 and in this position no electromotive force is induced in coil 2. This position is indicated by the point G in Fig. 6. Upon further forward motion of coil 2 it will be noted that the polarity of the lines of induction of the magnetic field will be reversed with respect to the coil 2, and consequently, an electromotive force of opposite polarity, indicated by curve F, will be induced in coil 2. Continued movement of coil 2 relatively to the magnetic field will eventually bring the coil 2 to a position in which no lines of induction are cut by the coil and in this position no electromotive force is induced in the coil.

When the electromotive force of one polarity represented by curve E is impressed on the instrument input terminals 18 and 19, the reversible motor 3 will be energized for rotation in one direction to actuate the exhibiting member 4 away from its zero position in the direction as indicated by the curve H of Fig. 6. The extent to which the exhibiting member 4 is so adjusted is a function of both the magnitude of the generated electromotive force E in coil 2 and also the duration of that electromotive force. It will be observed that the speed of adjustment of member 4 gradually increases as the electromotive force E generated in coil 2 gradually increases and becomes a maximum when that electromotive force is at a maximum value. When the electromotive force E decreases to zero as at G, the exhibiting member 4 will come to rest at the deflected position indicated by the reference symbol I.

Upon reversal of the electromotive force generated in coil 2, as indicated by curve F, the reversible motor 3 will be energized for rotation in the opposite direction and actuate the exhibiting member 4 in the reverse direction to return it to its original zero position. The extent to which the member 4 is so adjusted is a function of both the magnitude of the generated electromotive force F in coil 2 and also the duration of that electromotive force.

If the factors giving rise to the electromotive force represented by curve F are identical to those creating the electromotive force represented by curve E, the exhibiting member 4 will be returned to its original zero position and come to rest as the electromotive force F decreases to zero. If those factors are not the same, the exhibiting member 4 will be at a position other than its zero position when the electromotive force F decreases to zero, but will nevertheless be slowly returned to its original zero position due to the action of the restoring electromotive force previously described and created by the electrical network section 17.

Merely by way of illustration, it is noted that when the voltage of each of the batteries 117 and 126 is 1½ volts, correspondingly suitable values for the various components of the electrical network sections 14, 15, 16 and 17 may be as follows:

| Part | | Value |
|---|---|---|
| 119 | ohms | 15,000 |
| 17C | do | 1,000 |
| 43 | do | 200 |
| 120 | do | 1,000 |
| 121 | do | 1,000 |
| 122 | do | 3 |
| 127 | do | 100 |
| 128 | do | 10 |
| 132 | do | 25,000 |
| 133 | do | 25,000 |
| 134 | do | 5,000 |
| 135 | do | 509.5 |
| 15a | do | 400 |
| 15b | mfd | 500 |

Also, when the tubes 10 and 11 are of the commercially available 7N7 type, the voltage produced between the center tap 102 and each end of the secondary winding 55 of transformer 32 is 275 volts, and the inductance of the motor phase winding 57 is 10 henries, correspondingly suitable values of the various components of the feedback bridge network 104 may be as follows:

| Part | | Value |
|---|---|---|
| 100 | ohms | 150 |
| 105 | mfd | 0.1 |
| 106 | ohms | 15,000 |
| 107 | do | 535,000 |

Figure 7:
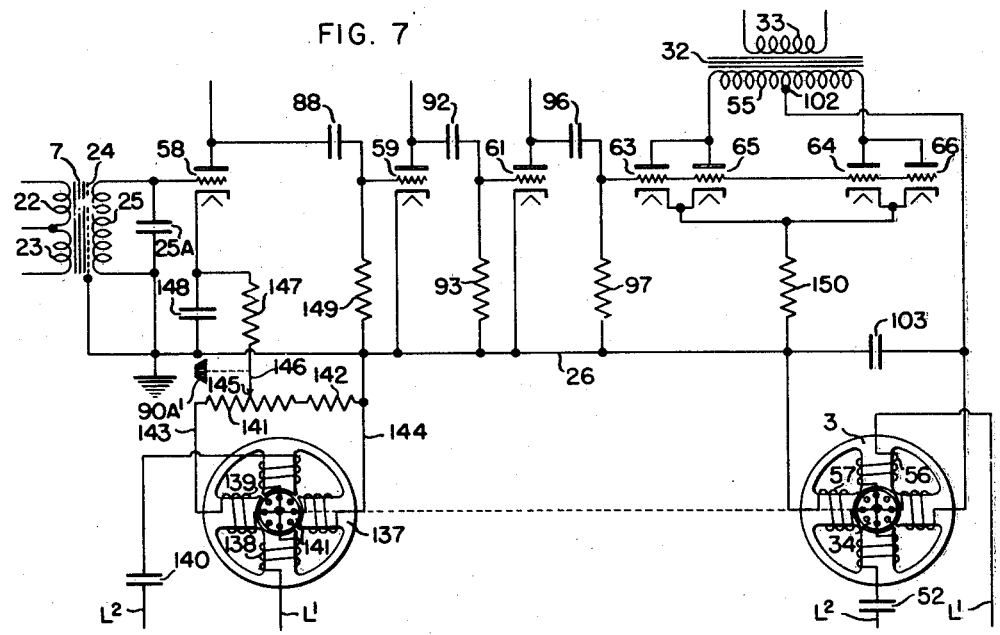
Fig. 7 is a wiring diagram illustrating a modification of the electronic amplifier and motor drive system of Fig. 1.

In Fig. 7 we have illustrated, more or less diagrammatically, a modification of the feedback control means of Figs. 1 and 3 for causing the speed of rotation of the motor rotor 34 to vary in a linear manner with the magnitude of the electromotive force generated in the exploring coil 2 over a wide range of variation of that electromotive force. With this modification it has been found that the linear relationship between the motor speed and the magnitude of the generated electromotive force of coil 2 is somewhat better than that which is obtained by means of the arrangement of Figs. 1 and 3. This modified arrangement also is capable of so regulating the energization of motor 3 for rotation that the motor speed may be gradually varied from zero speed up to full speed as the electromotive force impressed on the apparatus input terminals 18 and 19 is varied from zero to 1700 microvolts. Such range expansion, moreover, is accomplished while retaining the desirable operation of initiation of motor rotation on very small electromotive forces, for example, of the order of 10 microvolts or less.

As shown, the feedback control means of this modification includes a generator which has been generally designated by the reference numeral 137 and is provided in place of the electrical bridge network 104 of Figs. 1 and 3. The generator 137 may be termed a "field distorting generator" and its construction has been shown as being identical to that of the reversible motor 3. It is shown as having two field windings 138 and 139 which are wrapped around the stator pole pieces in such manner as to be displaced from each other by 90°. The field winding 138 is connected to the alternating current supply lines L' and L² through a condenser 140 of suitable value. The rotor 141 may be provided with rotor bars similarly to the rotor 34 of motor 3 or, if desired, may comprise merely a thin copper cylinder on an iron core. The shaft of rotor 141 is mechanically coupled to the shaft of motor 3 so that the two rotors 141 and 34 rotate in unison.

When the rotor 141 is stationary, no electromotive force is induced in the field winding 139 from the winding 138, but as the rotor 141 is rotated the lines of induction established in the rotor by the field winding 138 are distorted whereby some of the said lines of induction are caused to pass through the field winding 139. The amount of distortion gradually increases from zero at zero speed of rotation of the rotor to substantially 90° at high speeds.

The electromotive force induced in field winding 139 is impressed on a pair of series connected resistances 141 and 142 by means of conductors 143 and 144. One end of the resistance 142 is connected directly to the grounding conductor 26 and a contact 145 in slideable engagement with the resistance 141 is connected by a conductor 146 in which a resistance 147 is inserted to the cathode of triode 58. A condenser 148 of suitable value is connected between the cathode of triode 58 and the grounding conductor 26. Thus, the feedback electromotive force is arranged to be impressed on the input circuit of the triode 58 in this modification instead of on the input circuit of triode 59 as in Figs. 1 and 3.

It will be noted that the resistances 141, 142 and 147 and the condenser 148 are employed in the modification of Fig. 7 in place of the parallel connected resistance 84 and condenser 85 of the arrangements of Figs. 1 and 3. Furthermore, the resistance elements 89 and 90 in the input circuit of the triode 59 in Figs. 1 and 3 have been replaced by a fixed resistance 149, and the bridge network 104 in the cathode circuits of the triodes 63, 64, 65 and 66 has been replaced by a single cathode biasing resistance 150. In addition, the condenser 98 connected in shunt to the resistance 97 in the input circuits of the triodes 63, 64, 65 and 66 has been eliminated. Otherwise the electronic amplifying section and the motor drive section of the modification of Fig. 7 is the same as that of the arrangement of Figs. 1 and 3.

The value of condenser 140 is so chosen in relation to the inductance of the generator field windings 138 and 139 that upon motor rotation an electromotive force substantially in phase with the voltage of the supply lines L' and L² or 180° out of phase therewith, depending upon the direction of motor rotation, will be induced in the generator field winding 139. This electromotive force is impressed on the input circuit of the triode 58 in such manner as to oppose the alternating signal voltage impressed thereon from the transformer secondary winding 25. With this modification, as well as the apparatus embodiment of Figs. 1 and 3, therefore, the rotation of the motor 3 may be regulated by the feedback electromotive force in such manner that the motor will have a definite speed for each different value of the electromotive force impressed on the input terminals 18 and 19 from the exploring coil 2 over a wide range of variation of that input electromotive force. The amount of the feedback electromotive force, and hence, the range of variation of the input electromotive force over which the motor speed may be varied from zero to full speed may be adjusted, as desired, by movement of the contact 145 along the length of the slidewire resistance 141. To this end the contact 145 may be adjusted along the length of resistance 141 by manipulation of a control dial 90A'.

Figure 8:
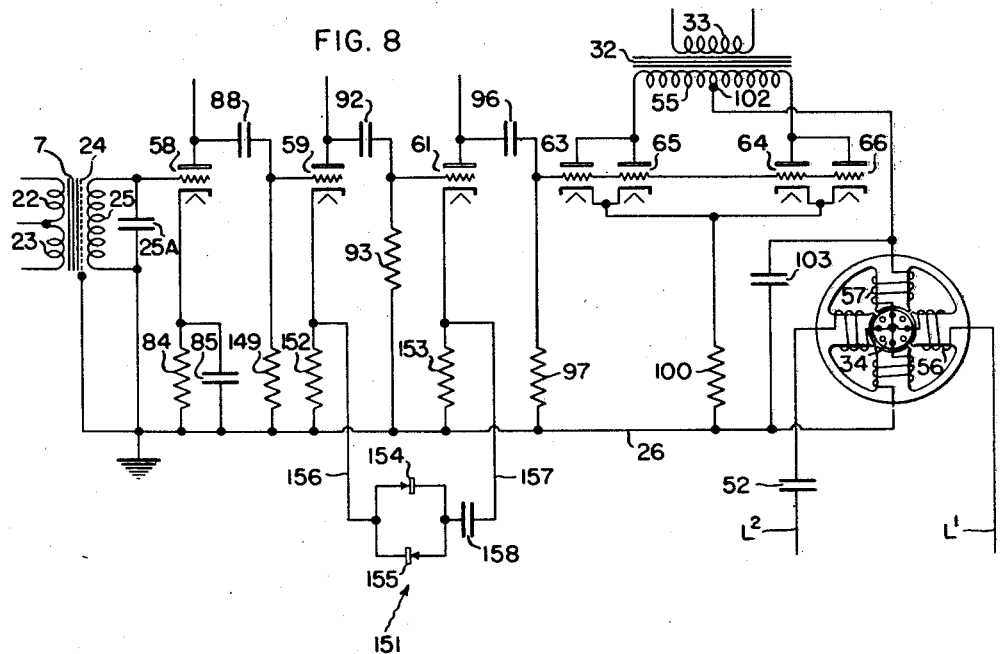
Fig. 8 is a wiring diagram illustrating another modification of the electronic amplifier and motor drive system of Fig. 1.

In Fig. 8 we have illustrated, more or less diagrammatically, a modification of the apparatus of Figs. 1 and 3 wherein a selenium type rectifier arrangement generally designated by the reference symbol 151 is employed in lieu of the feedback bridge network 104 for regulating the energization of the motor 3 for rotation as required to cause the speed of motor rotation to vary in a linear manner with the generated electromotive force of exploring coil 2 over a wide range of variation of that electromotive force. It will be apparent, upon examination of Fig. 8, that the use of this modification permits a substantial reduction in the amount of equipment involved.

The selenium rectifier feedback network 151 is connected between the cathode circuit of the triode 61 and the cathode circuit of the triode 59 and is utilized as a resistance which varies automatically to change the amount of feedback electromotive force from the output circuit of triode 61 to the input circuit of triode 59 in accordance with the magnitude of the alternating signal voltage produced in the output circuit of triode 61. Consequently, the electromotive force so fed back will be small when the said alternating signal voltage is small whereby motor initiation on small alternating signal voltages is made possible.

As shown, a cathode biasing resistance 152 is provided in the input circuit of triode 59 and a cathode biasing resistance 153 is provided in the input circuit of the triode 61. One terminal of the selenium rectifier feedback network 151, comprising the point of connection of one end of each of a pair of selenium rectifier elements which are oppositely connected in parallel, is connected by a conductor 156 to the cathode of triode 59, and the other terminal thereof is connected by a conductor 157 to the cathode of triode 61. In addition to the rectifier elements 154 and 155 the selenium rectifier feedback network includes a condenser 158 of suitable value which is connected in the conductor 156. While the rectifier elements 154 and 155 have been described as being selenium rectifier elements, it will be understood that these rectifier elements may be of any other type such as copper-oxide rectifier elements. Furthermore, rectifier elements need not be employed inasmuch as any type of resistance element, the resistance value of which is a function of the electrical current flow which the said rectifier elements conduct may be utilized. This characteristic operation of selenium rectifier elements is utilized in the modification of Fig. 8 in order to regulate the amount of feedback electromotive force from the output circuit of triode 61 to the input circuit of triode 59 in accordance with the magnitude of the alternating signal voltage.

Selenium rectifier elements are characterized in that their resistance values are relatively high in the conducting direction when the current passed is small, but become very low as the conducted current increases. In order to permit current conduction in both directions between the output circuits of triodes 59 and 61, two such rectifiers connected oppositely in parallel are provided.

In a practical, working embodiment of this modification of our invention, the rectifier elements 154 and 155 were so chosen that the resistance of the dual rectifier unit was approximately 300 ohms which made the percentage of feedback electromotive force low on small alternating signal voltages, and consequently, allowed the motor 3 to be energized sufficiently to rotate even though the alternating signal voltages were small. As the current flow through the dual rectifier unit gradually increases, however, its resistance gradually decreases to a few ohms, thereby gradually increasing the feedback electromotive force.

Subject matter disclosed in this application but not claimed herein is disclosed and claimed in the application for patent of Walter P. Wills, filed December 1, 1941, Serial No. 421,173, now Patent No. 2,423,540 of July 8, 1947.

While in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without without a corresponding use of other features.

Having now described our invention, what we claim as new and desire to secure by Letters Patent is as follows:

1. The method of obtaining a measure of the strength of a magnetic field which consists of the steps of relatively moving a magnetic field and an exploring device to derive an electrical effect the direction of which corresponds to the direction of said magnetic field and the magnitude of which is a function of the strength of said magnetic field and also of the rate of relative movement of said magnetic field and said exploring device, applying said electrical effect to motor means to control the energization of said motor means for operation of the latter in a direction corresponding to that of said electrical effect for a period the duration of which corresponds to that of said electrical effect and at a speed which is in substantially linear accordance with the magnitude of said electrical effect, utilizing the operation of said motor means for moving an exhibiting member from a predetermined position in a direction corresponding to the direction of operation of said motor means for a period the duration of which corresponds to that of the operation of said motor means and at a rate which corresponds to the speed of operation of said motor means, utilizing the operation of said motor means for deriving a second electrical effect the magnitude of which is a function of the speed of operation of said motor means, opposing said second electrical effect and the first mentioned electrical effect in the control of the energization of said motor means to suppress the increase in the rate of motion of said exhibiting member tending to be effected by operation of said motor means as said first mentioned electrical effect increases in magnitude, thereby to expand the range of variation of said first mentioned electrical effect over which the rate of movement of said exhibiting member varies from zero to a maximum, and additionally controlling the energization of said motor means in accordance with the position of said exhibiting member as required to restore and maintain said exhibiting member in said predetermined position when the magnitude of said first mentioned electrical effect decreases below a predetermined value.

2. The method of obtaining a measure of the strength of a magnetic field which consists of the steps of relatively moving a magnetic field and an exploring device to derive an electrical effect the direction of which corresponds to the direction of said magnetic field and the magnitude of which is a function of the strength of said magnetic field and also of the rate of relative movement of said magnetic field and said exploring device, applying said electrical effect to motor means to control the energization of said motor means for operation of the latter in a direction corresponding to that of said electrical effect for a period the duration of which corresponds to that of said electrical effect and at a speed which is in substantially linear accordance with the magnitude of said electrical effect, utilizing the operation of said motor means for moving an exhibiting member from a predetermined position in a direction corresponding to the direction of operation of said motor means for a period the duration of which corresponds to that of the operation of said motor means and at a rate which corresponds to the speed of operation of said motor means, continuing such control of the energization of said motor means while the magnitude of said electrical effect is greater than a predetermined value, and additionally controlling the energization of said motor means in accordance with the position of said exhibiting member as required to restore and maintain said exhibiting member in said predetermined position when the magnitude of said electrical effect decreases below a predetermined value.

3. The method of obtaining a measure of the strength of a magnetic field which consists of the steps of relatively moving a magnetic field and an exploring device to derive an electromotive force the magnitude of which is a function of the concentration of the lines of induction in said magnetic field and also of the rate of relative movement of said magnetic field and said exploring device and the polarity of which is determined by the direction of said lines of induction with respect to the direction of relative movement of said magnetic field and said exploring device, translating said electromotive force into an electromotive force having an alternating component of magnitude and of one phase or of opposite phase determined respectively by the magnitude and polarity of the first mentioned electromotive force, amplifying said alternating component, applying said amplified component to motor means to control the energization of said motor means for operation of the latter in a direction corresponding to the phase of said amplified component for a period the duration of which corresponds to that of said amplified component and at a speed which is in substantially linear accordance with the magnitude of said amplified component, utilizing the operation of said motor means for moving an exhibiting member from a predetermined position in a direction corresponding to the direction of operation of said motor means for a period the duration of which corresponds to that of the operation of said motor means and at a rate which corresponds to the speed of operation of said motor means, utilizing the operation of said motor means for deriving a second alternating component of electromotive force the magnitude of which is a function of the speed of operation of said motor means and the phase of which corresponds to the direction of operation of said motor means, and opposing said second component and said amplified component in the control of the energization of said motor means to suppress the increase in the rate of motion of said exhibiting member tending to be effected by said motor means as said amplified component increases in magnitude, thereby to expand the range of variation of said first mentioned electromotive force over which the rate of movement of said exhibiting member varies from zero to a maximum.

4. The method of obtaining a measure of the strength of a magnetic field which consists of the steps of relatively moving a magnetic field and an exploring device to derive an electromotive force the magnitude of which is a function of the concentration of the lines of induction in said magnetic field and also of the rate of relative movement of said magnetic field and said exploring device and the polarity of which is determined by the direction of said lines of induction with respect to the direction of relative movement of said magnetic field and said exploring device, translating said electromotive force into an electromotive force having an alternating component of magnitude and of one phase or of opposite phase determined respectively by the magnitude and polarity of the first mentioned electromotive force, amplifying said alternating component, applying said amplified component to motor means to control the energization of said motor means for operation of the latter in a direction corresponding to the phase of said amplified component for a period the duration of which corresponds to that of said amplified component and at a speed which is in substantially linear accordance with the magnitude of said amplified component, utilizing the operation of said motor means for moving an exhibiting member from a predetermined position in a direction corresponding to the direction of operation of said motor means for a period the duration of which corresponds to that of the operation of said motor means and at a rate which corresponds to the speed of operation of said motor means, utilizing the operation of said motor means for deriving a second alternating component of electromotive force the magnitude of which is a function of the speed of operation of said motor means and the phase of which corresponds to the direction of operation of said motor means, opposing said second component and said amplified component in the control of the energization of said motor means to suppress the increase in the rate of motion of said exhibiting member tending to be effected by said motor means as said amplified component increases in magnitude, thereby to expand the range of variation of said first mentioned electromotive force over which the rate of movement of said exhibiting member varies from zero to a maximum, and additionally controlling the energization of said motor means in accordance with the position of said exhibiting member as required to restore and maintain said exhibiting member in said predetermined position when the magnitude of said first mentioned electromotive force decreases below a predetermined value.

5. The method of positioning a movable member in substantially linear accordance with the duration and the amplitude of swing of a regularly fluctuating electromotive force which consists of the steps of applying said electromotive force to motor means to control the energization of said motor means for operation of the latter for a period the duration of which corresponds to that of said electromotive force and at a speed which is in substantially linear accordance with the amplitude of swing of said electromotive force, utilizing the operation of said motor means for moving a movable member from a predetermined position for a period the duration of which corresponds to that of the operation of said motor means and at a rate which corresponds to the speed of operation of said motor means, continuing such control of the energization of said motor means while the amplitude of swing of said electromotive force is greater than a predetermined value, and additionally controlling the energization of said motor means in accordance with the position of said movable member as required to restore and maintain said movable member in said predetermined position when the amplitude of swing of said electromotive force decreases below a predetermined value.

6. The method of positioning an exhibiting member in substantially linear accordance with the duration and the magnitude of an electromotive force of one polarity or of opposite polarity and in one direction or the other depending upon said polarity which consists of the steps of translating said electromotive force into an electromotive force having an alternating component of a magnitude and of one phase or of opposite phase determined respectively by the magnitude and polarity of the first mentioned electromotive force, amplifying said alternating component, applying said amplified component to motor means to control the energization of said motor means for operation of the latter in a direction corresponding to the phase of said amplified component for a period the duration of which corresponds to that of said amplified component and at a speed which is in substantially linear accordance with the magnitude of said amplified component, utilizing the operation of said motor means for moving an exhibiting member from a predetermined position in a direction corresponding to the direction of operation of said motor means for a period the duration of which corresponds to that of the operation of said motor means and at a rate which corresponds to the speed of operation of said motor means, utilizing the operation of said motor means for deriving a second alternating component of electromotive force the magnitude of which is a function of the speed of operation of said motor means and the phase of which corresponds to the direction of operation of said motor means, opposing said second component and said amplified component in the control of the energization of said motor means to suppress the increase in the rate of motion of said exhibiting member tending to be effected by said motor means as said amplified component increases in magnitude, thereby to expand the range of variation of said first mentioned electromotive force over which the rate of movement of said exhibiting member varies from zero to a maximum, and additionally controlling the energization of said motor means in accordance with the position of said exhibiting member as required to restore and maintain said exhibiting member in said predetermined position when the magnitude of said first mentioned electromotive force decreases below a predetermined value.

7. In apparatus to obtain a measure of the strength of a magnetic field and including an exploring device arranged to be moved relatively to the magnetic field to produce an electrical effect the magnitude of which is a function of the strength of said magnetic field and also the rate of relative movement of said magnetic field and exploring device, the combination comprising an exhibiting member to indicate the strength of said magnetic field, an electric motor to adjust said exhibiting member, electronic amplifying means having an input circuit to which the electrical effect produced by the exploring device is applied to control said electronic amplifying means, and having an output circuit directly electrically connected to said electric motor and arranged to energize said electric motor in such manner that said electric motor adjusts said exhibiting member for a period in accordance with the duration of said electrical effect and at a rate in substantially linear accordance with the magnitude of said electrical effect, and means operative when said electrical effect is less than a predetermined value and said exhibiting member is deflected from a predetermined position to control said control means as required to cause said electric motor to adjust said exhibiting member to said predetermined position.

8. The combination of claim 7 wherein said last mentioned means includes a slidewire resistance and a relatively movable engaging contact connected in an electrical network and so related in position when said exhibiting member is in said predetermined position that no output electrical effect is obtained from said network, and mechanical means operated by said eelctrical motor to change the positional relation between said slidewire resistance and contact to produce an output electrical effect from said network tending to control said control means when said exhibiting member is deflected from said predetermined position.

9. The combination of claim 7 including means to apply an electrical effect of fixed magnitude to said control means to substantially eliminate the influence of substantially constant extraneous electrical effects upon said control means and thereby upon said electric motor.

10. The combination of claim 7 wherein said control means includes a detector circuit having impedance upon which said electrical effect is impressed, and means to vary the proportion of said electrical effect which is impressed on said detector circuit without significantly varying the impedance of said detector circuit.

11. The combination of claim 7 wherein said control means includes a detector circuit having impedance upon which said electrical effect is impressed and wherein the means operative to control the control means to cause adjustment of the exhibiting member to said predetermined position when said electrical effect is less than a predetermined value includes a slidewire resistance and a relatively movable engaging contact connected in an electric network and so related in position when said exhibiting member is in said predetermined position that no output electrical effect is obtained from said network, mechanical means operated by said electric motor to change the positional relation between said slidewire resistance and contact to produce an output electrical effect from said network which is impressed on said detector circuit and tends to control said control means, means to vary the proportion of said first mentioned electrical effect which is impressed on said detector circuit without significantly varying the impedance of said detector circuit, adjustable means to apply an electrical effect on said detector circuit to substantially eliminate the influence of substantially constant extraneous electrical effects upon said control means and thereby upon said electric motor, and means to eliminate the output electrical effect from said network to facilitate adjustment of said adjustable means.

12. In apparatus to obtain a measure of the strength of a magnetic field and including an exploring device arranged to be moved relatively to the magnetic field to produce an electrical effect the magnitude of which is a function of the strength of said magnetic field and also the rate of relative movement of said magnetic field and exploring device, the combination comprising an exhibiting member to indicate the strength of said magnetic field, an electric motor to adjust said exhibiting means, electronic amplifying means having an input circuit to which the electrical effect produced by the exploring device is applied to control said electronic amplifying means, and having an output circuit directly electrically connected to said electric motor and arranged to energize said electric motor in such manner that said electric motor adjusts said exhibiting member for a period in accordance with the duration of said electrical effect and at a rate in substantially linear accordance with the magnitude of said electrical effect, means associated with said control means to produce a second electrical effect the magnitude of which is a function of the rate of adjustment of said exhibiting member by said electric motor, means to oppose said second electrical effect to said first mentioned electrical effect to suppress increases in the rate of adjustment of said exhibiting member by said electric motor as said first mentioned electrical effect increases in magnitude to thereby expand the range of variation of said first mentioned electrical effect over which the rate of adjustment of said exhibiting member by said electric motor varies from standstill to full speed, and means operative when said electrical effect is less than a predetermined value and said exhibiting member is deflected from a predetermined position to control said control means as required to cause said electric motor to adjust said exhibiting member to said predetermined position.

13. In apparatus to obtain a measure of the strength of a magnetic field and including an exploring device arranged to be moved relatively to the magnetic field to produce an electromotive force the magnitude of which is a function of the strength of said magnetic field and also the rate of relative movement of said magnetic field and exploring device and the direction of which is dependent upon the polarity of said magnetic field, the combination comprising an exhibiting member to indicate the strength of said magnetic field, an electric motor to adjust said exhibiting means, electronic amplifying means having an input circuit to which the electromotive force produced by the exploring device is applied to control said electronic amplifying means, and having an output circuit directly electrically connected to said electric motor and arranged to energize said electric motor in such manner that said electric motor adjusts said exhibiting member for a period in accordance with the duration of said electromotive force and at a rate in substantially linear accordance with the magnitude of said electromotive force and in a direction determined by the direction of said electromotive force, means associated with said control means to produce a second electromotive force the magnitude of which is a function of the rate of adjustment of said exhibiting member by said electric motor, means to oppose said second electromotive force to said first mentioned electromotive force to suppress increases in the rate of adjustment of said exhibiting member by said electric motor as said first mentioned electromotive force increases in magnitude to thereby expand the range of variation of said first mentioned electromotive force over which the rate of adjustment of said exhibiting member by said electric motor varies from standstill to full speed, and means operative when said first mentioned electromotive force is less than a predetermined value and said exhibiting element is deflected from a predetermined position to control said control means as required to cause said electric motor to adjust said exhibiting member to said predetermined position.

14. The combination of claim 13 wherein said last mentioned means includes means responsive to the extent and direction of departure of said exhibiting member from said predetermined position over a limited range to produce an electromotive force which is variable from zero to a maximum as said exhibiting member is moved through said limited range and is of one polarity or the other accordingly as said exhibiting member is deflected in one direction or the other from said predetermined position, and means to apply said last mentioned electromotive force to control said control means.

15. The combination of claim 13 wherein said control means includes a detector circuit having impedance upon which said first mentioned electromotive force is impressed and wherein the means operative to control the control means to cause adjustment of the exhibiting member to said predetermined position when said first mentioned electromotive force is less than a predetermined value includes a slidewire resistance and a relatively movable engaging contact connected in an electric network and so related in position when said exhibiting member is in said predetermined position that no output electromotive force is obtained from said network, control switch means arranged to be actuated when said exhibiting member is deflected from said predetermined position, operated by said electric motor to actuate said control switch means and to change the positional relation between said slidewire resistance and contact to produce an output electromotive force from said network which is impressed on said detector circuit and tends to control said control means, means to vary the proportion of said first mentioned electromotive force which is impressed on said detector circuit without significantly varying the total impedance of said detector circuit, adjustable means to apply an electromotive force on said detector circuit to substantially eliminate the influence of substantially constant extraneous electromotive forces upon said control means and thereby upon said electric motor, and means to eliminate the output electromotive force from said network to facilitate adjustment of said adjustable means.

16. In apparatus to obtain a measure of the strength of a magnetic field comprising an exploring device arranged to be moved relatively to the magnetic field to produce an electromotive force the magnitude of which is a function of the strength of said magnetic field and also the rate of relative movement of said magnetic field and exploring device the combination comprising means to derive from said electromotive force a corresponding electromotive force alternating in polarity at a fixed frequency, means to amplify said derived electromotive force, an exhibiting member to indicate the strength of said magnetic field, an electric motor to adjust said exhibiting means, means under control of the amplified quantity of said derived electromotive force to control said electric motor in such manner that said electric motor adjusts said exhibiting member for a period in accordance with the duration of said electromotive force and at a rate in substantially linear accordance with the magnitude of said derived electromotive force, means associated with said control means to derive from the amplified quantity of said derived electromotive force an electromotive force alternating in polarity at said fixed frequency and the magnitude of which is a function of the rate of adjustment of said exhibiting member by said electric motor, and means to oppose said last mentioned electromotive force to the amplified quantity of said alternating electromotive force to suppress increases in the rate of adjustment of said exhibiting member by said electric motor as said alternating electromotive force increases in magnitude to thereby expand the range of variation of said first mentioned electromotive force over which the rate of adjustment of said exhibiting member by said electric motor varies from standstill to full speed.

17. In apparatus to obtain a measure of the strength of a magnetic field and including an exploring device arranged to be moved relatively to the magnetic field to produce an electrical effect the magnitude of which is a function of the strength of said magnetic field and also the rate of relative movement of said magnetic field and exploring device, the combination including an exhibiting member to indicate the strength of said magnetic field, a pair of grid controlled electronic devices having output circuits adapted to be connected to a source of alternating current and having a common output circuit to which said electronic devices are connected in parallel relation, means to supply grid potentials to said electronic devices to selectively render one of said devices more conductive than the other to an extent dependent upon the magnitude of said electrical effect, and an electric motor having a winding adapted to be connected to the alternating current supply source and a winding connected to the output circuit of said electronic devices to adjust said exhibiting member, said grid supply means including a network in which said second mentioned winding is connected to derive an electrical effect proportional to the motor speed and means to oppose said derived electrical effect to said first mentioned electrical effect.

18. In apparatus to obtain a measure of the strength of a magnetic field and including an exploring device arranged to be moved relatively to the magnetic field to produce an electrical effect the magnitude of which is a function of the strength of said magnetic field and also the rate of relative movement of said magnetic field and exploring device, the combination including an exhibiting member to indicate the strength of said magnetic field, a pair of grid controlled electronic devices having output circuits adapted to be connected to a source of alternating current and having a common output circuit to which said electronic devices are connected in parallel relation, means to supply grid potentials to said electronic devices to selectively render one of said devices more conductive than the other to an extent dependent upon the magnitude of said electrical effect, and an electric motor having a winding adapted to be connected to the alternating current supply source and a winding connected to the output circuit of said electronic devices to adjust said exhibiting member, said grid supply means including an electric generator driven by said electric motor to derive an electrical effect proportional to the motor speed and means to oppose said derived electrical effect to said first mentioned electrical effect.

19. In apparatus to obtain a measure of the strength of a magnetic field and including an exploring device arranged to be moved relatively to the magnetic field to produce an electrical effect the magnitude of which is a function of the strength of said magnetic field and also the rate of relative movement of said magnetic field and exploring device, the combination including an exhibiting member to indicate the strength of said magnetic field, a pair of grid controlled electronic devices having output circuits adapted to be connected to a source of alternating current and having a common output circuit to which said electronic devices are connected in parallel relation, means including a plural stage amplifier having an input circuit to which the electrical effect produced by the exploring device is applied and having an output circuit to supply grid potentials to said devices to render one of said devices more conductive than the other to an extent dependent upon the magnitude of said electrical effect, and an electric motor having a winding adapted to be connected to the alternating current supply source and a winding connected to the output circuit of said electronic devices to adjust said exhibiting member, said grid supply means including a feedback circuit between two of the stages of said amplifier having connected therein a pair of oppositely connected rectifiers the resistance values of which vary inversely with the electric current conducted thereby.

20. In apparatus to obtain a measure of the strength of a magnetic field and including an exploring device arranged to be moved relatively to the magnetic field to produce an electromotive force of one polarity or of opposite polarity depending upon the direction of said magnetic field and of a magnitude determined by the strength of said magnetic field and also the rate of relative movement of said magnetic field and exploring device, the combination including an exhibiting member to indicate the strength of said magnetic field, a pair of grid controlled electronic devices having output circuits adapted to be connected to a source of alternating current and having a common output circuit to which said electronic devices are connected in parallel relation, means including a detector circuit upon which said electromotive force is impressed to supply grid potentials to said electronic devices to selectively render one of said devices more conductive than the other depending upon the polarity of said electromotive force and to an extent determined by the magnitude of said electromotive force, and a reversible electric motor having a winding adapted to be connected to the alternating current supply source and a winding connected to the output circuit of said electronic devices to adjust said exhibiting member, said grid supply means including a network in which said second mentioned winding is connected to derive an electromotive force proportional to the motor speed and means to oppose said derived electromotive force to said first mentioned electromotive force.

21. The combination of claim 20 including means operative to control said grid supply means to cause adjustment of said exhibiting member to a predetermined position when said first mentioned electromotive force is less than a predetermined value comprising a slidewire resistance and a relatively movable engaging contact connected in an electric network included in said detector circuit and so related in position when said exhibiting member is in said predetermined position that no output electromotive force is obtained from said network, mechanical means operated by said reversible motor to change the positional relation between said slidewire resistance and contact to produce an output electromotive force from said network which is impressed on said detector circuit and is of the proper polarity to cause adjustment of said exhibiting member by said reversible motor to said predetermined position, means to vary the proportion of said first mentioned electromotive force which is impressed on said detector circuit without significantly varying the total resistance of said detector circuit, adjustable means to apply an electromotive force on said detector circuit to substantially eliminate the influence of substantially constant extraneous electromotive forces upon said grid supply means, means to eliminate the output electromotive force from said network to facilitate adjustment of said adjustable means, and filter means connected in said detector circuit to filter out extraneously introduced fluctuating current components.

22. Apparatus to position a movable member in substantially linear accordance with the duration and the amplitude of swing of a regularly fluctuating electromotive force and in a direction corresponding to the direction of swing of said electromotive force, comprising a movable member, an electric motor to adjust said movable member, means under control of said electromotive force to control said electric motor in such manner that said electric motor adjusts said movable member from a predetermined position in a direction corresponding to the direction of swing of said electromotive force for a period in accordance with the duration of said electromotive force and at a rate in substantially linear accordance with the amplitude of swing of said electromotive force, and electrical means operative when the amplitude of swing of said electromotive force is less than a predetermined value and said movable member is deflected from said predetermined position to control said control means as required to cause said electric motor to adjust said movable member to said predetermined position.

23. Apparatus to position an exhibiting member in substantially linear accordance with the duration and the magnitude of an electromotive force of one polarity or of opposite polarity and in one direction or the other depending upon said polarity comprising means to translate said electromotive force into an electromotive force having an alternating component of a magnitude and of one phase or of opposite phase determined respectively by the magnitude and polarity of said first mentioned electromotive force, means to amplify said alternating component of electromotive force, an electric motor to adjust said exhibiting member, means controlled by the amplified quantity of said alternating component to control said electric motor in such a manner that said electric motor adjusts said exhibiting member at a rate in substantially linear accordance with the amplitude of swing of the amplified quantity of said alternating component and in a direction determined by the phase of said quantity, means associated with said control means to produce a second alternating component of electromotive force the magnitude and phase of which are respectively a function of the rate and direction of adjustment of said exhibiting member by said electric motor, means to oppose said last mentioned alternating component of electromotive force to the amplified quantity of said first mentioned alternating component of electromotive force to suppress increases in the rate of adjustment of said exhibiting member by said electric motor as the magnitude of said first mentioned electromotive force increases to thereby extend the range of variation of said first mentioned electromotive force over which the rate of adjustment of said exhibiting member by said electric motor increases from standstill to full speed, and means operative when said first mentioned electromotive force is less than a predetermined value and said exhibiting member is deflected from a predetermined position to control said control means as required to cause said electric motor to adjust said exhibiting member to said predetermined position.

24. Apparatus to position an exhibiting member in substantially linear accordance with the duration and the amplitude of swing of a regularly fluctuating electromotive force comprising a pair of grid controlled electronic devices having output circuits adapted to be connected to a source of alternating current and having a common output circuit to which said electronic devices are connected in parallel relation, means to supply grid potentials to said electronic devices to selectively render one of said devices more conductive than the other to an extent dependent upon the amplitude of swing of said electromotive force, and an electric motor having a winding adapted to be connected to the alternating current supply source and a winding connected to the output circuit of said electronic devices to adjust said exhibiting member, said grid supply means including an impedance bridge network in one arm of which said second mentioned winding is connected to derive a regularly fluctuating electromotive force having an amplitude of swing proportional to the motor speed and means to oppose said derived electromotive force to said first mentioned electromotive force.

25. Apparatus to position an exhibiting member in substantially linear accordance with the duration and the amplitude of swing of a regularly fluctuating electromotive force comprising a pair of grid controlled electronic devices having output circuits adapted to be connected to a source of alternating current and having a common output circuit to which said electronic devices are connected in parallel relation, means to supply grid potentials to said electronic devices to selectively render one of said devices more conductive than the other to an extent dependent upon the amplitude of swing of said electromotive force, and an electric motor having a winding adapted to be connected to the alternating current supply source and a winding connected to the output circuit of said electronic devices to adjust said exhibiting member, said grid supply means including an electric generator driven by said electric motor to derive an electromotive force having an amplitude of swing proportional to the motor speed and means to oppose said derived electromotive force to said first mentioned electromotive force.

26. Apparatus to position an exhibiting member in substantially linear accordance with the duration and the amplitude of swing of a regularly fluctuating electromotive force comprising a pair of grid controlled electronic devices having output circuits adapted to be connected to a source of alternating current and having a common output circuit to which said electronic devices are connected in parallel relation, means including a plural stage amplifier to supply grid potentials to said electronic devices to selectively render one of said devices more conductive than the other to an extent dependent upon the amplitude of swing of said electromotive force, and an electric motor having a winding adapted to be connected to the alternating current supply source and a winding connected to the output circuit of said electronic devices to adjust said exhibiting member, said grid supply means including a feedback circuit between two of the stages of said amplifier having connected therein a pair of oppositely connected rectifiers the resistance values of which vary inversely with the electric current conducted thereby.

THOMAS R. HARRISON.
LLOYD B. CHERRY.

REFERENCES CITED

The following references are of record in the file of this patent:

UNITED STATES PATENTS

| Number | Name | Date |
| --- | --- | --- |
| 1,258,284 | Weinrich | Mar. 5, 1918 |
| 1,314,610 | Smith et al. | Sept. 2, 1919 |
| 2,054,672 | Edgar | Sept. 15, 1936 |
| 2,147,729 | Wurmser | Feb. 21, 1939 |
| 2,209,369 | Wills | July 30, 1940 |
| 2,287,942 | Nelson | June 30, 1942 |
| 2,300,742 | Harrison et al. | Nov. 3, 1942 |